United States Patent
Kamoi et al.

(10) Patent No.: US 8,207,690 B2
(45) Date of Patent: Jun. 26, 2012

(54) HIGH-PRESSURE DISCHARGE LAMP BALLAST WITH RAPID LAMP RESTART CIRCUIT

(75) Inventors: Takeshi Kamoi, Kyoto (JP); Akira Yufuku, Himeji (JP)

(73) Assignee: Panasonic Corporation, Osaka (JP)

( * ) Notice: Subject to any disclaimer, the term of this patent is extended or adjusted under 35 U.S.C. 154(b) by 427 days.

(21) Appl. No.: 12/606,251

(22) Filed: Oct. 27, 2009

(65) Prior Publication Data
US 2010/0109572 A1 May 6, 2010

(30) Foreign Application Priority Data
Oct. 28, 2008 (JP) .................... 2008-277429

(51) Int. Cl.
*H05B 37/02* (2006.01)
(52) U.S. Cl. ...................................... 315/308
(58) Field of Classification Search .......... 315/291, 315/307, 308, 209 R, 224, 225, 276
See application file for complete search history.

(56) References Cited

U.S. PATENT DOCUMENTS

| | | | |
|---|---|---|---|
| 7,002,305 B2 * | 2/2006 | Kambara et al. | 315/291 |
| 7,439,690 B2 * | 10/2008 | Fukuwa | 315/308 |
| 7,759,878 B2 * | 7/2010 | Yufuku et al. | 315/291 |
| 7,804,259 B2 * | 9/2010 | Ootsuka et al. | 315/307 |
| 2006/0214607 A1 * | 9/2006 | Blake | 315/380 |

FOREIGN PATENT DOCUMENTS

| | | |
|---|---|---|
| JP | 2778257 | 9/1992 |
| JP | 1994260289 | 9/1994 |
| JP | 2005285434 | 10/2005 |

* cited by examiner

*Primary Examiner* — Douglas W Owens
*Assistant Examiner* — Amy Yang
(74) *Attorney, Agent, or Firm* — Waddey & Patterson, P.C.; Mark J. Patterson; Gary L. Montle

(57) ABSTRACT

An electronic ballast is provided for quickly restarting a high-pressure discharge lamp after shutdown. The ballast includes a power supply circuit for supplying power to the lamp from a commercial power source, a start voltage generation circuit for supplying a starting high voltage to the lamp and a control circuit for controlling the power supply circuit and the start voltage generation circuit. A lighting transition module detects a startup or shutdown of the lamp. A lighting time count module measures a lighting time of the lamp when startup is detected. A comparison module compares the lighting time and a first reference time when shutdown is detected. A delay time setting module sets a predetermined delay time of the start voltage generation circuit based on the comparison result. Operation of the ballast is halted from a startup trigger until lapse of the delay time, and then the high starting voltage is supplied to the lamp.

23 Claims, 27 Drawing Sheets

HIGH-PRESSURE DISCHARGE LAMP BALLAST WITH RAPID LAMP RESTART CIRCUIT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. JP2008-277429, filed Oct. 28, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to an electronic ballast for powering a high-pressure discharge lamp. The present invention more particularly relates to an electronic ballast configured for quickly restarting a high-pressure lamp even under conditions where the lamp has been previously shut down after a short operating time.

Referring to FIG. 22, an example of a high-pressure lamp ballast as known in the art is shown. The ballast includes a rectifier circuit DB1 for rectifying a commercial power source AC. A step-up chopper circuit 1 steps up a rectified voltage of the rectifier circuit DB1. A step-down chopper circuit 2 steps down an output voltage of the step-up chopper circuit 1 and provides a desired output. An inverter circuit 3 converts a DC output of the step-down chopper circuit 2 into a rectangular wave AC voltage and applies it to a high-pressure discharge lamp La. A start voltage generation circuit 4 generates a high voltage as required for lamp startup and applies it to the high-pressure discharge lamp La. A control circuit 50 is provided for controlling the respective operations of the step-up chopper circuit 1, the step-down chopper circuit 2, the inverter circuit 3, and the start voltage generation circuit 4.

The step-up chopper circuit 1 includes a capacitor C1 connected between output terminals of the rectifier circuit DB1, a series circuit of an inductor L1 and a diode D1 coupled to a positive output terminal of the rectifier circuit DB1, a switching element Q1 connected in parallel with the capacitor C1 through the inductor L1, and a capacitor C2 that is connected in parallel with the switching element Q1 through the diode D1. The step-up chopper circuit 1 generates a voltage VC2 across capacitor C2 that is a rectified voltage stepped up by the switching element Q1 being driven on and off.

The step-down chopper circuit 2 includes a series circuit of a switching element Q2 and an inductor L2 that is coupled to a positive terminal of the step-up chopper circuit 1, a diode D2 that is connected in parallel with the capacitor C2 through the switching element Q2, and a capacitor C3 that is connected in parallel with the diode D2 through the inductor L2. The step-down chopper circuit 2 generates a voltage Vc3 across the capacitor C3 that is the output voltage of the step-up chopper circuit 1 stepped down by the switching element Q2 being driven on and off, and provides a desired output signal.

The inverter circuit 3 includes a series circuit of switching elements Q3, Q4 and a series circuit of switching elements Q5, Q6 that are connected in parallel to the capacitor C3. The connection mid points of the switching elements Q3, Q4 and the switching elements Q5, Q6 are used as output terminals. The inverter circuit 3 converts an output voltage Vc3 of the step-down chopper circuit 2 into a rectangular wave AC voltage Vo by the switching elements Q3, Q6 and the switching elements Q4, Q5 being alternately driven on and off, and provides the converted voltage as an output signal.

The control circuit 50 includes a step-up chopper control module 51, a step-down chopper control module 52, a lighting transition module 53, and an inverter control module 54.

The step-up chopper control module 51 includes a step-up output detection circuit 51a and a step-up chopper control circuit 51b, wherein the step-up output detection circuit 51a detects the output voltage Vc2 of the step-up chopper circuit 1, and feeds it back to the step-up chopper control circuit 51b. The step-up chopper control circuit 51b controls the output voltage Vc2 to a constant voltage by driving on and off the switching element Q1 based on the detected output voltage Vc2 of the step-up chopper circuit 1.

The step-down chopper control module 52 includes a step-down output detection circuit 52a and a step-down chopper control circuit 52b. The step-down output detection circuit 52a detects the output voltage Vc3 of the step-down chopper circuit 2, and feeds it back to the step-down chopper control circuit 52b. The step-down chopper control circuit 52b drives on and off the switching element Q2 based on the output voltage Vc3 of the step-down chopper circuit 2 that was detected, controls an output current of the step-down chopper circuit 2 to a predetermined current that depends on the output voltage Vc3, and supplies a desired power output to the high-pressure discharge lamp La.

Based on the output voltage Vc3 of the step-down chopper circuit 2, the lighting transition module 53 detects an intended startup or shutdown of the high-pressure discharge lamp La, and outputs the transition result to the step-down chopper control module 52.

The inverter control module 54 alternately drives on and off the switching elements Q3, Q6 and Q4, Q5 of the inverter circuit 3.

The start voltage generation circuit 4 is equipped with a pulse transformer T1. A secondary winding N2 of the pulse transformer T1 is serially connected to the high-pressure discharge lamp La between the output terminals of the inverter circuit 3. A series circuit made up of a parallel circuit of a primary winding N1 of the pulse transformer T1, a switching element Q10, and a resistor R1 and a capacitor C4 is connected in parallel with a series circuit of the high-pressure discharge lamp La and the secondary winding N2. The switching element Q10 is a voltage-responsive switching element that becomes conductive when the voltage across it exceeds a predetermined voltage. The charging voltage of the capacitor C4 is controlled by the resistor R1 upon switching off of the switching element Q10.

Below, an operation of this conventional example will be explained using waveform diagrams as shown in FIGS. 23(a) to (h). First, at the time the high-pressure discharge lamp La is shut down or extinguished, the step-down chopper circuit 2 outputs a high DC voltage compared to the time of turning on the high-pressure discharge lamp La in order to make the high-pressure discharge lamp La start satisfactorily. Then, as shown in FIGS. 23(a), (b), driving signals G1, G2 of the switching elements Q4, Q5 and the switching elements Q3, Q6 of the inverter circuit 3 turn on and off alternately, which makes the switching element Q3, Q6 and the switching elements Q4, Q5 turn on and off alternately. Therefore, an output of the inverter circuit 3 becomes the rectangular wave AC voltage Vo as shown in FIG. 23(c).

When the voltage Vc4 across the capacitor C4 of the start voltage generation circuit 4 is charged by the rectangular wave AC voltage Vo as shown in FIG. 23(d), a voltage Vq10 across the switching element Q10 shown in FIG. 23(e) rises, and when it exceeds the predetermined voltage, the switching element Q10 is subjected to breakdown and becomes conductive. In particular, an amplitude of the rectangular wave AC voltage Vo is substantially identical to the output voltage Vc3 of the step-down chopper circuit 2. Denoting the output voltage of the step-down chopper circuit 2 as Vc3, and the voltage across capacitor C4 as Vc4, a voltage across switching element Q10 at the time of stability of the rectangular wave AC voltage Vo (except at the time of polarity inversion) becomes |Vc3|−|Vc4|, which does not reach a breakdown voltage of the switching element Q10, and the switching element Q10 remains turned off. However, when the polarity of the rectangular wave AC voltage Vo is reversed, the voltage Vc4 does not change rapidly because of charging through the resistor R1, a voltage |Vc3|+|Vc4| is applied to both ends of the switching element Q10, the breakdown voltage is reached, and the switching element Q10 turns on.

When the switching element Q10 becomes conductive, a pulsed current flows in the primary winding N1 of the pulse transformer T1 with the capacitors C3, C4 acting as the power source, and a high-pressure pulse Vp shown in FIG. 23(f) is generated in the secondary winding N2 of the pulse transformer T1.

A lamp voltage Vla shown in FIG. 23(g) that is the rectangular wave AC voltage Vo output by the inverter circuit 3, with the high-pressure pulse of the start voltage generation circuit 4 superimposed thereon, is applied across the high-pressure discharge lamp La, and the lamp La starts at time T1. When the lighting transition module 53 detects startup of the high-pressure discharge lamp La in the step-down chopper control module 52, the step-down output detection circuit 52a detects the output voltage Vc3 of the step-down chopper circuit 2. The step-down chopper control circuit 52b controls the output current of the step-down chopper circuit 2 (corresponding to a lamp current Ila of FIG. 23(h)) to be the predetermined current that depends on the output voltage Vc3, supplies the high-pressure discharge lamp La with desired power, and in steady state ignites the high-pressure discharge lamp La.

Upon a lighting failure of the high-pressure discharge lamp La, the step-down chopper control circuit 52b detects the transition of the high-pressure discharge lamp La from the lighting transition module 53, determines that it was turned off, and performs the restart operation as shown in the flowchart of FIG. 24. First, the input power source is provided (S101), the high-pressure pulse Vp is generated by the start voltage generation circuit 4 (S102), and after startup, lighting control is performed for steady state operation of the high-pressure discharge lamp La (S103). Then the high-pressure discharge lamp La is monitored for a lighting failure based on the transition result of the lighting transition module 53 (S104). If the high-pressure discharge lamp La does not produce a lighting failure, the lighting control is continued, but when the high-pressure discharge lamp La produces a lighting failure, the high-pressure pulse Vp is generated again.

The inside of an arc tube gradually reaches a high temperature and a high pressure from the time of the startup, and the high-pressure discharge lamp La eventually reaches a stable lighting state. If the high-pressure discharge lamp La turns off from the stable lighting state, since the inside of the arc tube has reached a very high temperature and high pressure, it is known that the breakdown voltage required for discharge in the arc tube rises abruptly in a short time from about 100 V at the time of stable lighting, reaching 10 kV or more. In order to restart the high-pressure discharge lamp La immediately after turning it off from the stable lighting state, it is therefore necessary to apply a startup voltage of a 10-30 kV to the high-pressure discharge lamp La. However, it is difficult to secure insulation performance of the main body and wiring of the lamp fixture, and if q 30 kV start voltage is applied it may exceed insulation performance of the lamp fixture due to a structural problem of the high-pressure discharge lamp La. For example, in the case of a typical high-pressure discharge lamp La in which an outer tube 102 is attached to a base 101 of an Edison base, as shown in FIG. 25, and an arc tube 103 is housed in the outer tube 102, if the start voltage of 10 kV or more is applied there is a fear that dielectric breakdown may occur at the base 101 and a required voltage may not be applied to the inside of the arc tube 103.

Therefore, a typical high pressure ballast is designed so as to generate the breakdown voltage required for discharge inside the arc tube (e.g., about 4 kV) as a starting high voltage in a state where the target high-pressure discharge lamp La is sufficiently cooled. Therefore, at a time immediately after the high-pressure discharge lamp La is extinguished from a stable lighting state, since the breakdown voltage required for discharge inside the arc tube is high, it is impossible to re-light it. Then, after a period of time from the turning off of the lamp has elapsed, and thus the temperature inside the arc tube decreases and the breakdown voltage required for discharge inside the arc tube falls below the starting high voltage that can be generated by the high-pressure lamp ballast, a restart again becomes possible.

Depending on the type of high-pressure discharge lamp La, the structure of the lamp fixture, and the particulars of its installation, it is understood that this restart may require approximately ten minutes. During that time, the high pressure ballast keeps generating the starting high voltage continuously or intermittently. The state of the high-pressure discharge lamp La immediately after turning off, where the inside of the arc tube is at a high temperature and a high pressure, and the breakdown voltage is very high, is substantially the same state of an unloaded condition where the high-pressure discharge lamp La is not connected. Because it is not easy to differentiate a state of the high-pressure discharge lamp La immediately after being turned off from an unloaded condition, the ballast is configured to generate the starting high voltage even in the unloaded condition as described above.

Moreover, even in the case where the high-pressure discharge lamp La approaches the end of its life and becomes impossible to start, the high-pressure lamp ballast continues to generate the starting high voltage.

Referring now to FIG. 26, another high-pressure lamp ballast configuration of the prior art is shown to address the situation where the high pressure ballast generates the starting high voltage even in an unloaded condition or in an end-of-life state of the high-pressure discharge lamp La. This high-pressure lamp ballast has a power supply module 201 for supplying electric power to the high-pressure discharge lamp La, a starting high-voltage generating module 202 for generating the starting high voltage, a current detection module 203 for detecting a current supplied to the high-pressure discharge lamp La, and a monitoring control module 204 that monitors a state of the high-pressure discharge lamp La based on the lamp current detected by the current detection module 203 and controls the power supply module 201 and the starting high-voltage generating module 202.

When a light switch (not shown) is turned on to trigger startup (S201), as shown in a flow chart of FIG. 27, the monitoring control module 204 resets a counter (not shown) that is provided therein to "0" (S202). Subsequently, the monitoring control module 204 applies the starting high voltage to the high-pressure discharge lamp La by driving the starting high-voltage generating module 202 and increments the counter value (S203). Then, it determines whether the lamp current is more than or equal to a predetermined value (S204), and if so the startup is determined to have succeeded and the start control is ended (S205). On the other hand, if the lamp current is less than the predetermined value, it is determined whether the count value is equal to a predetermined number of times "4" (S206). If the count value is less than "4", the process returns to Step 203 where the starting high voltage is applied again. If the count value is "4", application of the starting high voltage has already been repeated four times consecutively, and it is determined that the startup failed. Operation of the starting high-voltage generating module 202 is halted, power flow from the power supply module 201 is halted (S207), and the start control is ended (S205). Thus, at the time of start failure, risks of damage to the high-pressure lamp ballast and electric shock from application of the starting high voltage for a long period of time are reduced.

Another example of a high-pressure lamp ballast, as shown in FIG. 28, prevents discharge inside the outer tube (discharge at a location 500 between the lead wires 104, 105 that are connected to both ends of the arc tube 103 as shown in FIG. 25) when the starting high voltage is applied to the high-pressure discharge lamp La in a state where the breakdown voltage has risen immediately after the lamp is extinguished from the stable lighting state. In this high-pressure lamp ballast, when the AC power source AC is provided, a power source control circuit 310 operates to make a control circuit 309 send control signals to a step-up inverter 303, a step-down inverter 304, a rectangular wave circuit 306, and a start pulse generation circuit 307, respectively, each of which then starts its operation. The step-up inverter 303 steps up an output rectified by a rectifier circuit 302 to a specified voltage; the step-down inverter 304 regulates the output so that a current flowing into the high-pressure discharge lamp La may become a specified current. The square wave circuit 306 outputs an AC rectangular wave voltage of a specified frequency to the high-pressure discharge lamp La. A start pulse generation circuit 307 generates high-pressure pulse and starts the high-pressure discharge lamp La. In addition, a current sensing resistor 305 detects a current of the high-pressure discharge lamp La and lighting transitions may be detected.

When the high-pressure discharge lamp La has a lighting failure, the control circuit 309 controls the start pulse generation circuit 307 to perform a restart. The operation is such that, as shown in the flowchart of FIG. 29, first a lighting switch (not shown) turns on to trigger the power supply (S301). Then the start pulse generation circuit 307 generates the starting high voltage as pulses with a predetermined frequency and applies it to the high-pressure discharge lamp La (S302). Next, after resetting the lighting time counter for counting the operating time of the high-pressure discharge lamp La (S303), the intensity of the high-pressure discharge lamp La is controlled by the AC power from the square wave circuit 306 (S304), and the operating time of the high-pressure discharge lamp La is recorded by the operating time counter (S305).

When a lighting failure of the high-pressure discharge lamp La in the lighting state is monitored (S306), and the lamp is turned off, the operating time counter of the high-pressure discharge lamp La determines whether the operating time exceeded a predetermined time (e.g., 10 minutes) (S307). When the operating time counter does not exceed the predetermined time, the process returns to the start control of S302.

When the operating time counter of the high-pressure discharge lamp La exceeds the predetermined time, the count number k is reset (S308), the count number k is counted up only by unity, operation is halted for a time period that permits the arc tube to restart easily (S309), and another restart by the start pulse generation circuit 307 is performed (S310). Next, the lighting transition of the high-pressure discharge lamp La is monitored (S311), and if it lights normally the process returns to Step S304. If it does not light normally, it is determined whether the number of discontinuous arc discharges exceeded, for example, a predetermined number of times (e.g., 1024 times) (Step S312). If it did not exceed the predetermined number of times, the process will return to Step S310. If it exceeds the number, it is judged whether the count number k is 3 (S313), and then if the count number k is less than 3, the process returns to Step S309. If the count number k is 3, the high-pressure lamp ballast will terminate operation for protection purposes (S314).

Therefore, in a period where the restart is impossible (with the starting high voltage generated by the high-pressure lamp ballast when the high-pressure discharge lamp becomes stable), the breakdown voltage rises, and subsequently is turned off, the restart is not performed. Application of a needless starting high voltage is suppressed and inside-outer-tube discharge and electric shock are prevented.

In yet another example of a high-pressure lamp ballast as shown in FIG. 30, the high-pressure discharge lamp La is connected to the AC power source AC through a power source switch (not shown) and a stabilizer 401. Moreover, a start pulse generation circuit 402 is connected to the stabilizer 401, and at the time of startup the start pulse generation circuit 402 operates to make the stabilizer 401 apply the starting high voltage to the high-pressure discharge lamp La, which causes a starting operation of the high-pressure discharge lamp La. Then, when a lighting detection circuit 403 detects that the high-pressure discharge lamp La lights and the lamp current flows, operation of the start pulse generation circuit 402 is prohibited and generation of the starting high voltage is restricted.

There is further provided a pulse control circuit 404 for restricting the generation of the starting high voltage when an attempt is made to again input power and perform the restart, after the lamp La passed through the continuous lighting state and subsequently the power source was temporarily cut off. This pulse control circuit 404 is provided with a timer circuit 404a that is based on a counter etc. and is for counting the lighting time of the lamp La up to the shutdown by power source interruption. An output side of this timer circuit 404a is connected with a conversion circuit 404b. This conversion circuit 404b converts the lighting time that was counted by the timer circuit 404a into a required pulse delay time Tw according to a constant predetermined conversion ratio. In addition, a timer circuit 404c that counts an elapsed time Tp from the shutdown by power source interruption to return of the power source is provided. Outputs of these conversion circuit 404b and timer circuit 404c are input into a comparator 404, and its comparison result is output to an output circuit 404e.

The output circuit 404e controls a pulse generating operation of the start pulse generation circuit 402 in response to a comparison output of the comparator 404. If Tw≦Tp after a comparison of a pulse waiting time Tw and the elapsed time Tp, it will generate the high-pressure pulse. This is done by making a light-emitting diode 405a emit instantaneously, making a photo-thyristor 405b that is photo-coupled thereto conductive, gate-triggering a bidirectional thyristor 406 that is serially connected to the start pulse generation circuit 402, and making the start pulse generation circuit 402 operate. However, if Tw>Tp as the result of the comparison, after a time (Tw-Tp) elapses a high-pressure pulse is generated by making the light-emitting diode 405a emit light, making the photo-thyristor 405b that is photo-coupled thereto conductive, gate-triggering the bidirectional thyristor 406, and making the start pulse generation circuit 402 operate.

In this way, the control circuit self-determines a first time required from input of the power source until the high-pressure discharge lamp La may become restarted, decides a second time until the lamp is to be restarted after having been turned off according to the determination, and generates the starting high voltage after the appropriate time elapsed, whereby application of a needless starting high voltage is suppressed.

In typical high-pressure lamp ballasts such as those described above, when they are turned off before reaching a stable lighting state, the inside of the high-pressure discharge lamp does not reach a high temperature or a high pressure, and it is considered that a rise of the breakdown voltage required for discharge is also relatively small immediately after turning off. Therefore, the ballast attempts to start the lamp by applying the starting high voltage immediately.

However, depending on the type of high-pressure discharge lamp, it is hard to start even when the restart is performed immediately after the lamp is turned off before reaching a stable lighting mode. This phenomenon occurs particularly often in a high pressure discharge lamp that contains a metal iodide. This is due primarily to the starting high voltage making the amalgam (being a mercury compound) and the iodide scatter and adhere onto a tube wall near an electrode, wherein an easy-to-discharge path is formed along a tube wall and, upon a restart, discharge takes place along this discharge path.

Usually, as the inside of the arc tube achieves a high temperature and a high pressure due to a continuing discharge after startup, amalgam and an iodide that adhere to the tube wall evaporate. However, if the lamp turns off before these materials evaporate, the inside of the arc tube of the high-pressure discharge lamp La remains in an unstable state, and tends to only gradually return to a stable initial state. If the starting high voltage is applied in a state where the amalgam and iodide adhere to the tube wall in this way, a mode where glow discharge does not shift to main discharge continues because of occurrence of discharge along the above-mentioned discharge path formed on the tube wall. Even when the startup is attained, the iodide consumes electrons to be used for discharge, whereby discharge time is extended and the start time becomes prolonged. Moreover, in the high-pressure lamp ballast that halts its operations due to continuation of abnormal discharge, there arises a problem that the high pressure discharge lamp will not light.

FIG. 31 shows results of an experiment to determine whether restart is possible in the case where a high color-rendering and high-efficiency metal halide lamp is made to operate for a short time and subsequently is turned off, and after a predetermined time elapsed after being turning off, the power source is input again. This experimental result shows that in the case where the operating time is about 10 to 30 seconds, there is a domain B1 in which the restart fails depending on the length of off time, or delay, after the operating time.

BRIEF SUMMARY OF THE INVENTION

The present invention provides an electronic ballast capable of reliably restarting a high-pressure discharge lamp immediately after being turned off even when the previous operating time is short.

An electronic ballast for powering a high-pressure discharge lamp in accordance with an embodiment of the present invention includes: an electric power supply circuit for supplying power to the high-pressure discharge lamp; a start voltage generation circuit for supplying an initial starting high voltage to the high-pressure discharge lamp; and a control circuit for controlling the electric power supply circuit and the start voltage generation circuit. The control circuit has a lighting transition module for determining when the high-pressure discharge lamp is turned on or off, a lighting time count module for measuring a lighting time of the high-pressure discharge lamp after the lamp is turned on, a comparison module for comparing the lighting time measured by the lighting time count module and a first reference time after the lamp has been turned off, and a delay time setting module for setting a predetermined delay time of the start voltage generation circuit to be applied based on the comparison result of the comparison module. The delay time setting module sets up a predetermined delay time from when the high pressure discharge lamp is turned off from a lighting state. If the lighting time is shorter than the first reference time, the start voltage generation circuit terminates operation during a period from occurrence of a startup trigger to a lapse of the predetermined delay time, and the starting high voltage is only supplied to the high pressure discharge lamp after lapse of the delay time.

In the high-pressure lamp ballast of this embodiment, even in the case where an amalgam and an iodide adhere to a tube wall of the high-pressure discharge lamp because the previous lighting time is short, and thus the inside of the arc tube becomes unstable, the inside of the high-pressure discharge lamp is gradually returning to a stable initial state during a period of the delay time. Therefore even when the restart is done immediately after a short lighting time of the high-pressure discharge lamp, it becomes possible to safely and securely perform the restart.

In another embodiment of the present invention, the comparison module compares the first reference time and a second reference time shorter than the first reference time with the lighting time. When the lighting time is longer than the second reference time and is shorter than the first reference time when the high-pressure discharge lamp is turned off from a lighting state, the delay time setting module sets a predetermined delay time. When the lighting time is less than the second reference time or is greater than the first reference time, the delay time setting module sets the delay time to zero.

According to this embodiment, the reference times to be compared with the lighting time in the comparison module are specified to be two values. When the lighting time is the second reference time or less, the delay time at the time of the restart is not set up, whereby even when an unstable behavior of the high-pressure discharge lamp occurs, it is possible to reliably restart the high-pressure discharge lamp, and further when the restart is performed immediately after the high-pressure discharge lamp has been lit for a short time, it becomes possible to securely perform the restart.

In another embodiment of the present invention, the delay time setting module sets up a predetermined delay time that depends on the lighting time.

Since the delay time in the restart after a short lighting time can be finely adjusted based on the previous lighting time, it becomes possible to set the delay time to a minimum time by preventing an unnecessary long delay time to be set up, and therefore an interval from shutdown to restart can be shortened.

In yet another embodiment of the present invention, the delay time that is set when the lighting time is equal to the first reference time, and a delay time that is set when the lighting time is equal to the second reference time are of a maximum value of the delay time.

Therefore, with regards to the lighting time and the delay time, the delay time can be set up outside a condition where the restart fails.

In another embodiment of the present invention, the electric power supply circuit converts an electric power from the input power source into an electric power to be supplied to the high-pressure discharge lamp. The control circuit has a power source monitoring module for monitoring a supply state of the input power source to the electric power supply circuit and a power source interruption time count module for measuring a power source interruption time from interruption of the power source to the re-supply of the power source based on the monitoring result of the power source monitoring module. The comparison module compares the power source interruption time measured by the power source interruption count part and a third reference time. When the power source interruption time is shorter than the third reference time, the delay time setting module resets the delay time to zero.

When the power source interruption time is very short, it is possible to restart immediately irrespective of the lighting time. Especially when the high-pressure discharge lamp is made to shut down after a short lighting time, the inside of an arc tube is in an active state and a temperature of the arc tube has not risen, and therefore it becomes possible for the discharge lamp to immediately operate in a restartable domain by applying the starting voltage immediately after the shutdown. Further, even in the case where the temperature of the arc tube has risen to an extent that a long delay time is required for the re-start due to a long lighting time, it becomes possible for the discharge lamp to perform an operation immediately in the re-start domain by applying the starting high voltage immediately after the shutdown.

In another embodiment of the present invention, the control circuit has an interruption time comparison module for comparing the delay time being set up by the delay time setting module and the power source interruption time measured by the power source interruption time count module, and the delay time setting module resets the delay time to zero when the power source interruption time is longer than the delay time, and resets the delay time from which the power source interruption time is subtracted to a new delay time when the power source interruption time is shorter than the delay time.

Accordingly, because the power source interruption time of the input power source can be included in a required delay time, and the delay time at the time of the restart can be specified as a time that the high-pressure discharge lamp essentially needs, it is possible to set a time required for the restart to a minimum time while suppressing generation of an unnecessary starting high voltage.

A lamp fixture may be provided with an electronic ballast according to any of the previously described embodiments of the present invention and the high-pressure discharge lamps powered thereby.

In the lamp fixture, even in the case where the amalgam and iodide adhere to the tube wall of the high-pressure discharge lamp and the inside of the arc tube of the high-pressure discharge lamp becomes unstable because the previous lighting time is short, the inside of the high-pressure discharge lamp gradually returns to the stable initial state during the delay time, and therefore it becomes possible to securely perform the restart even when the restart is done immediately after the high-pressure discharge lamp has operated for a short time.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

For the purposes of this detailed description, "shutdown" of a lamp may refer to manual removal of power from a ballast with the intention of extinguishing the lamp, manually removing the lamp from the ballast, or extinguishing of the lamp for any period of time by any other cause, intended or otherwise. "Startup" of a lamp may refer to a step of applying power to a lamp from a ballast, applying power to ballast with the intention of starting up a lamp, or any other process carried out with the intention of transitioning the lamp from an unlit state to a lit state. Unless otherwise defined herein, "powering" a lamp may refer to either of supplying a high starting voltage to a lamp with the intention of transitioning the lamp from an unlit to a lit state or supplying a voltage to the lamp for steady state operation.

As explained above, an electronic ballast for powering a high-pressure discharge lamp in accordance with the present invention may restart the lamp immediately after shutdown even in the case where the lighting time is short.

Hereafter, embodiments of the present invention will be described based on the drawings.

Figure 1:
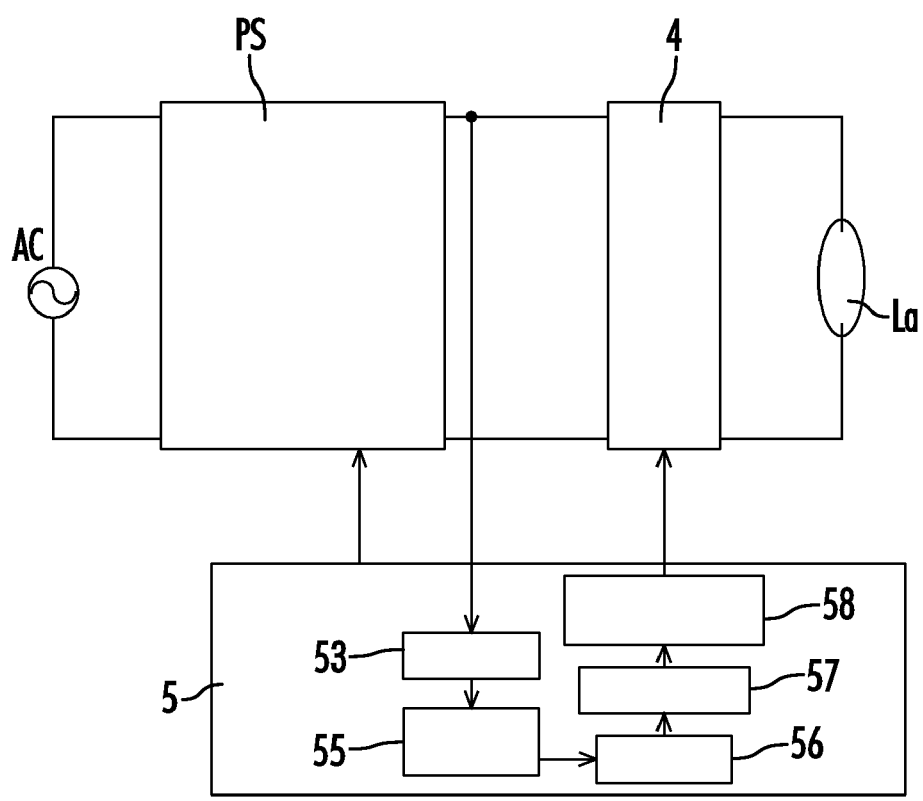
FIG. 1 is a block diagram of an embodiment of a high-pressure lamp ballast.

Various embodiments of the high-pressure lamp ballast of the present invention may be generally configured as shown in FIG. 1. The ballast includes an electric power supply circuit PS for supplying a proper electric power to the high-pressure discharge lamp La, using a commercial power source AC as an input. A start voltage generation circuit 4 is provided for generating a high voltage required for starting the high-pressure discharge lamp La (a starting high voltage) and applying this starting high voltage to the high-pressure discharge lamp La. A control circuit 5 is provided for controlling operation of the electric power supply circuit PS and the start voltage generation circuit 4.

Figure 2:
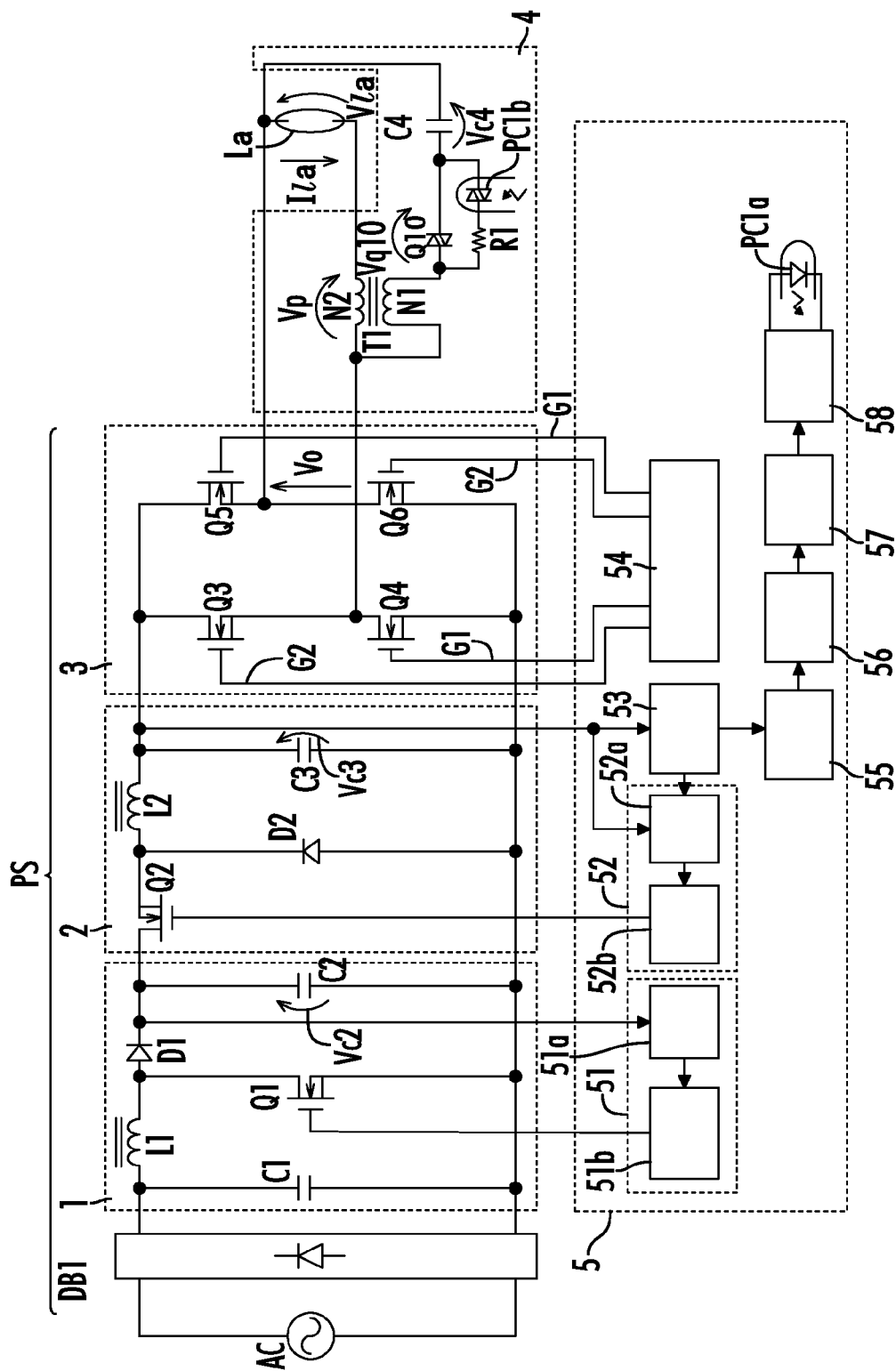
FIG. 2 is a diagram showing one embodiment of a circuit configuration of the embodiment of FIG. 1.
Figure 22:
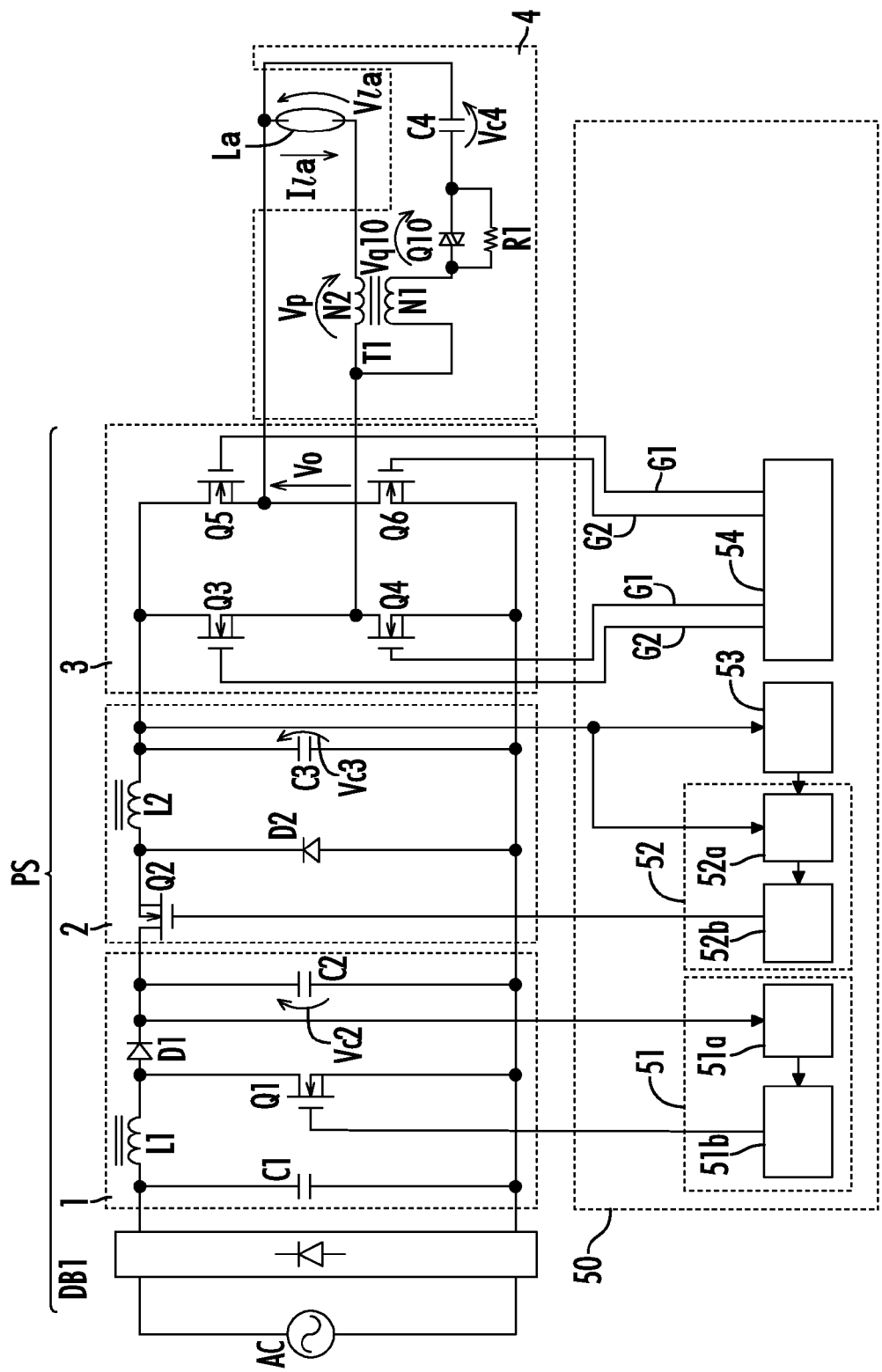
FIG. 22 is a diagram showing a circuit configuration of a high-pressure lamp ballast as known in the prior art.
Figure 23:
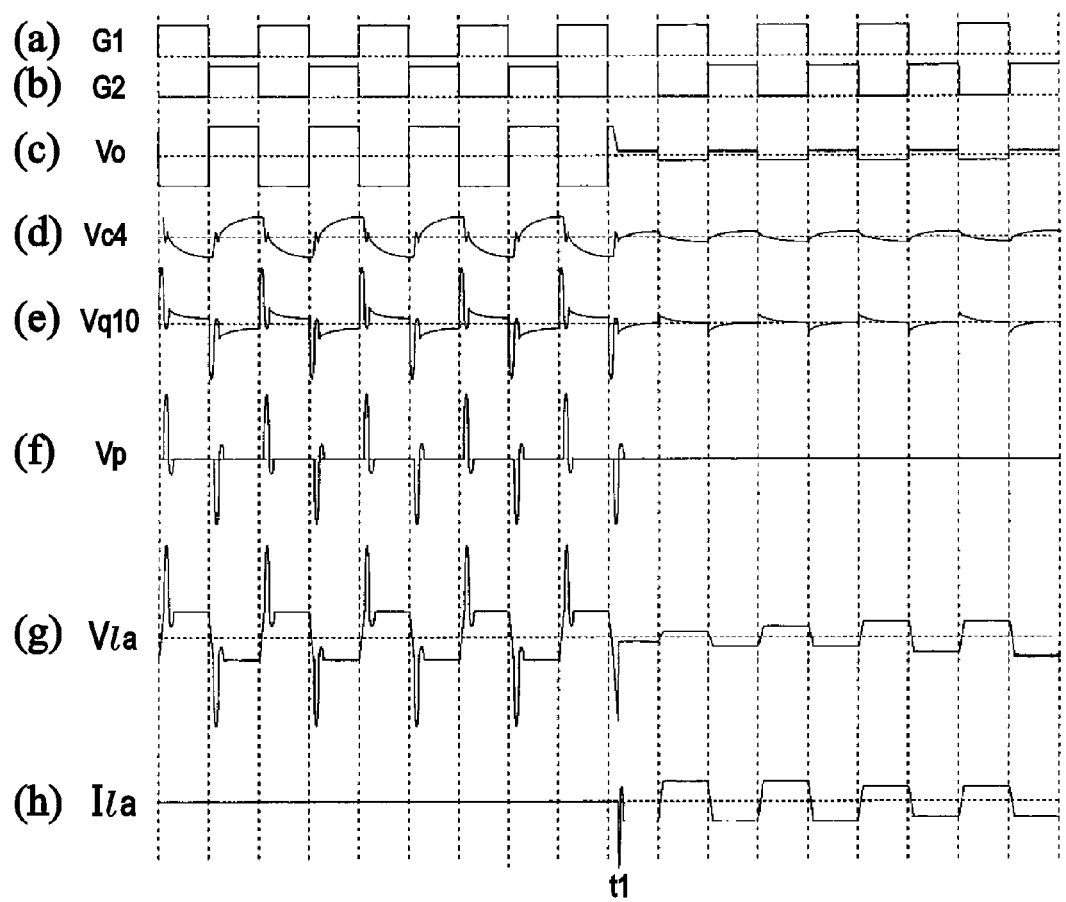
FIGS. 23(a) to (h) are diagrams each showing a waveform of each module of the high-pressure lamp ballast of FIG. 22.
Figure 24:
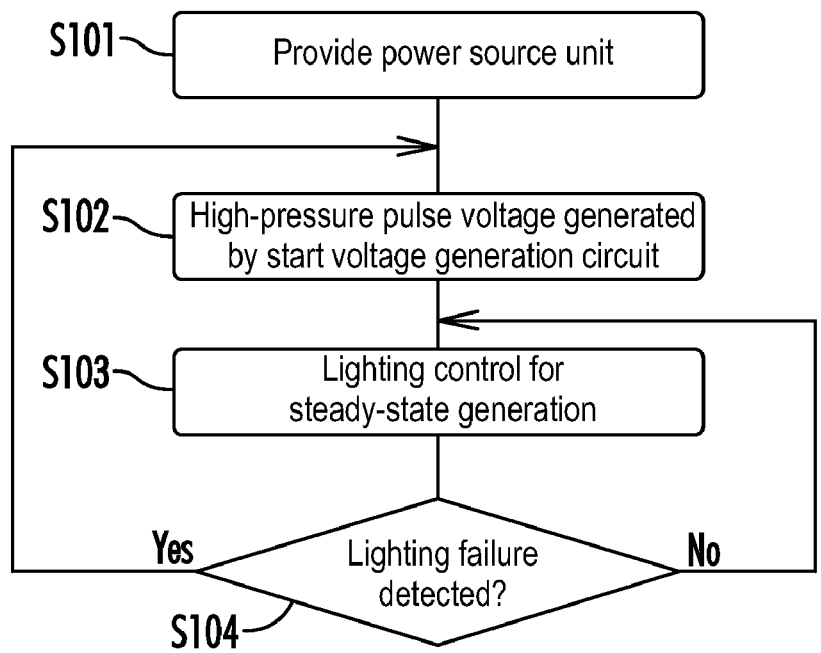
FIG. 24 is an operational flowchart of the high-pressure lamp ballast of FIG. 22.
Figure 25:
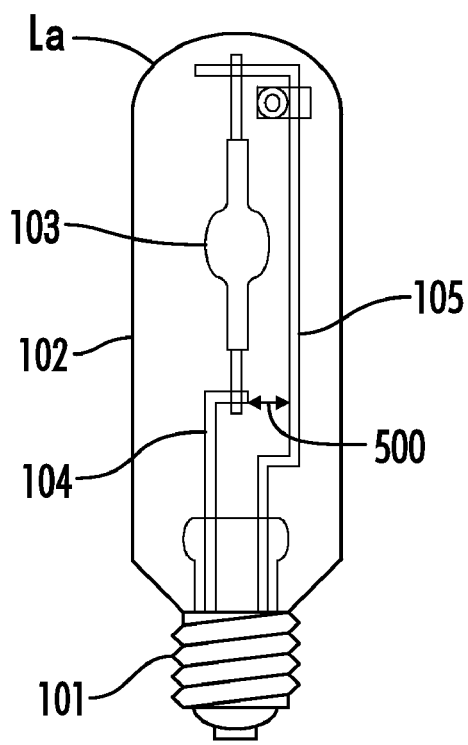
FIG. 25 is a diagram showing one example of a high-pressure discharge lamp for the high-pressure lamp ballast of FIG. 22.
Figure 26:
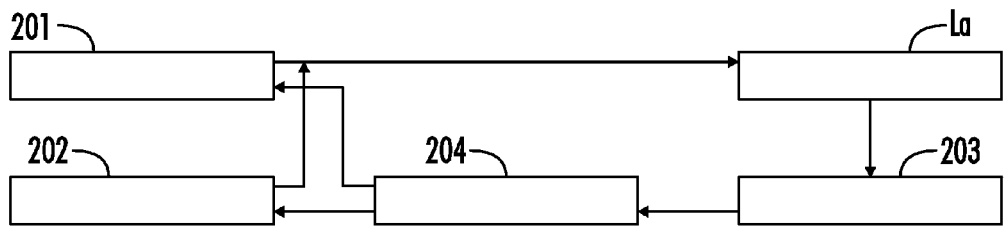
FIG. 26 is a block diagram of another high-pressure lamp ballast as known in the prior art.
Figure 27:
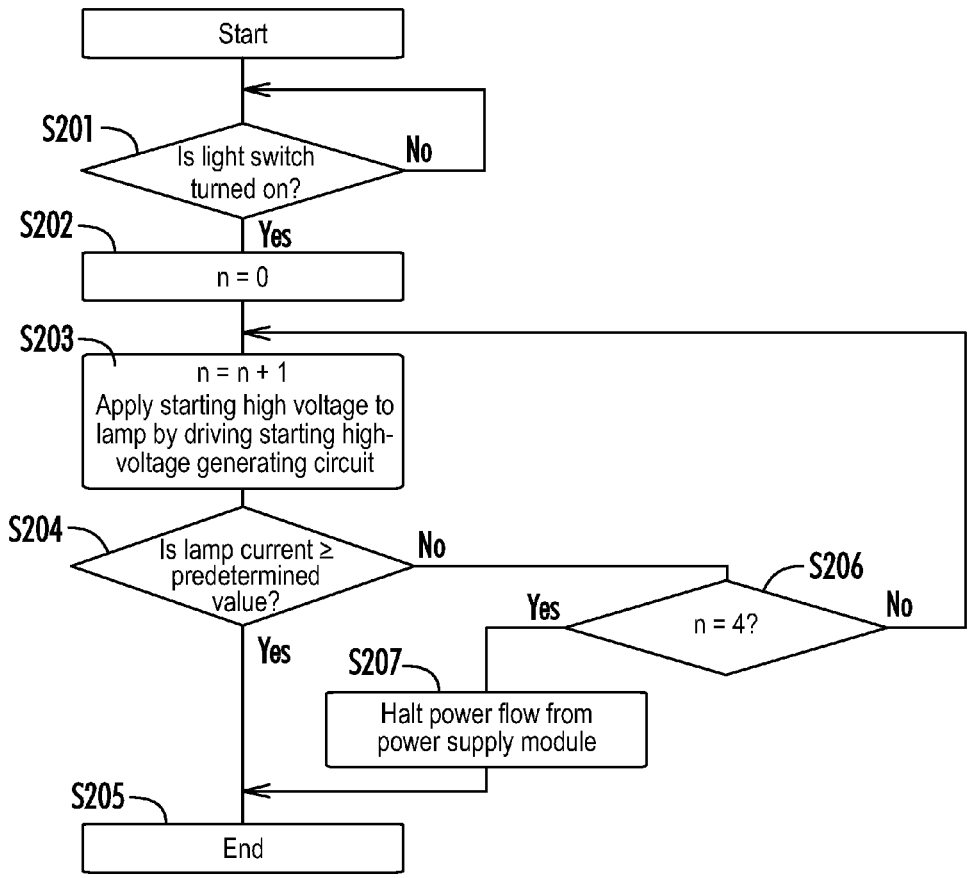
FIG. 27 is an operational flowchart of the high-pressure lamp ballast of FIG. 26.
Figure 28:
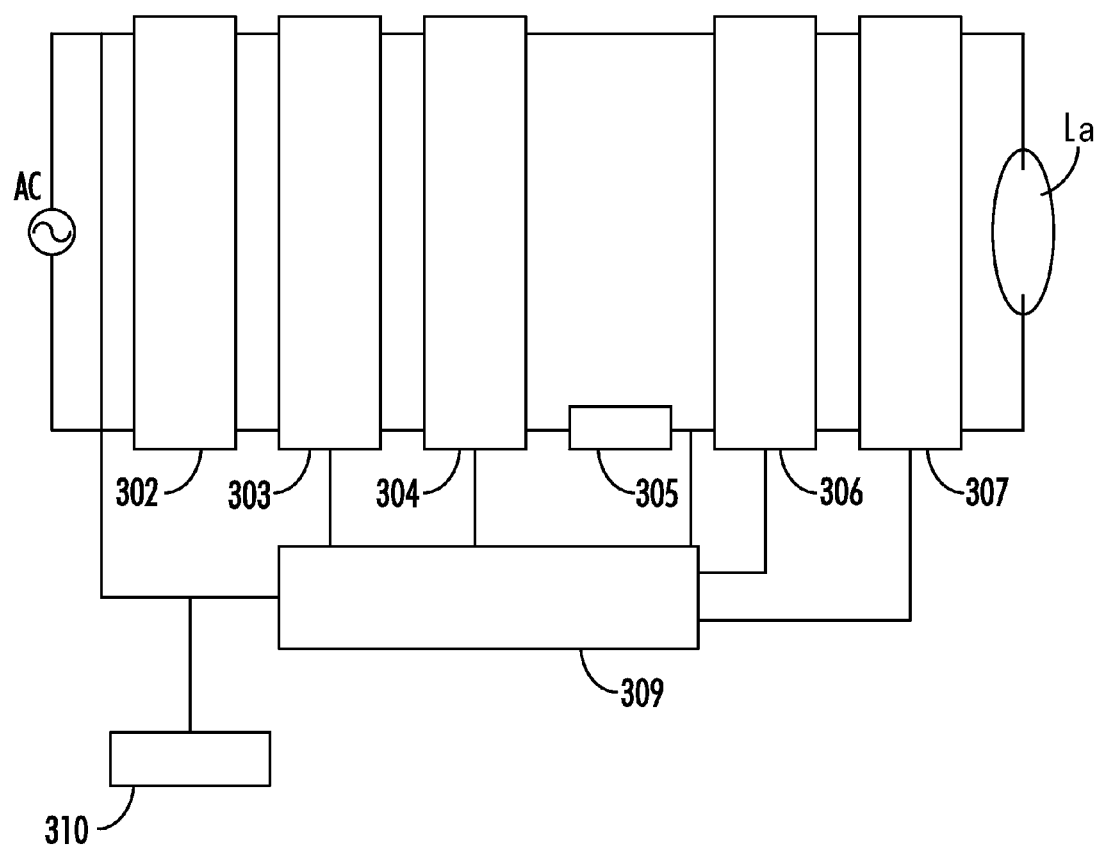
FIG. 28 is a block diagram of another high-pressure lamp ballast as known in the prior art.
Figure 29:
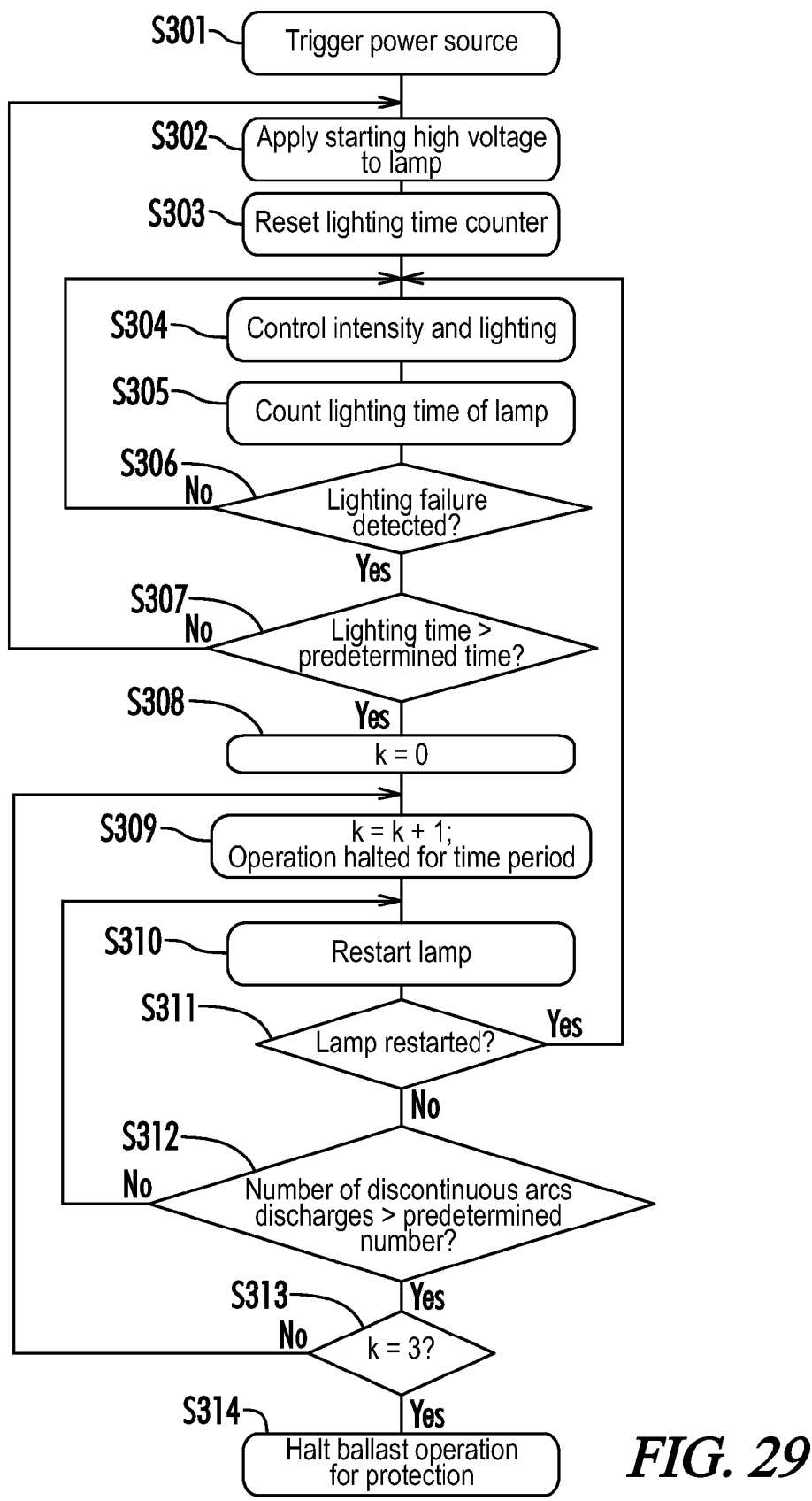
FIG. 29 is a an operational flowchart of the high-pressure lamp ballast of FIG. 28.
Figure 30:
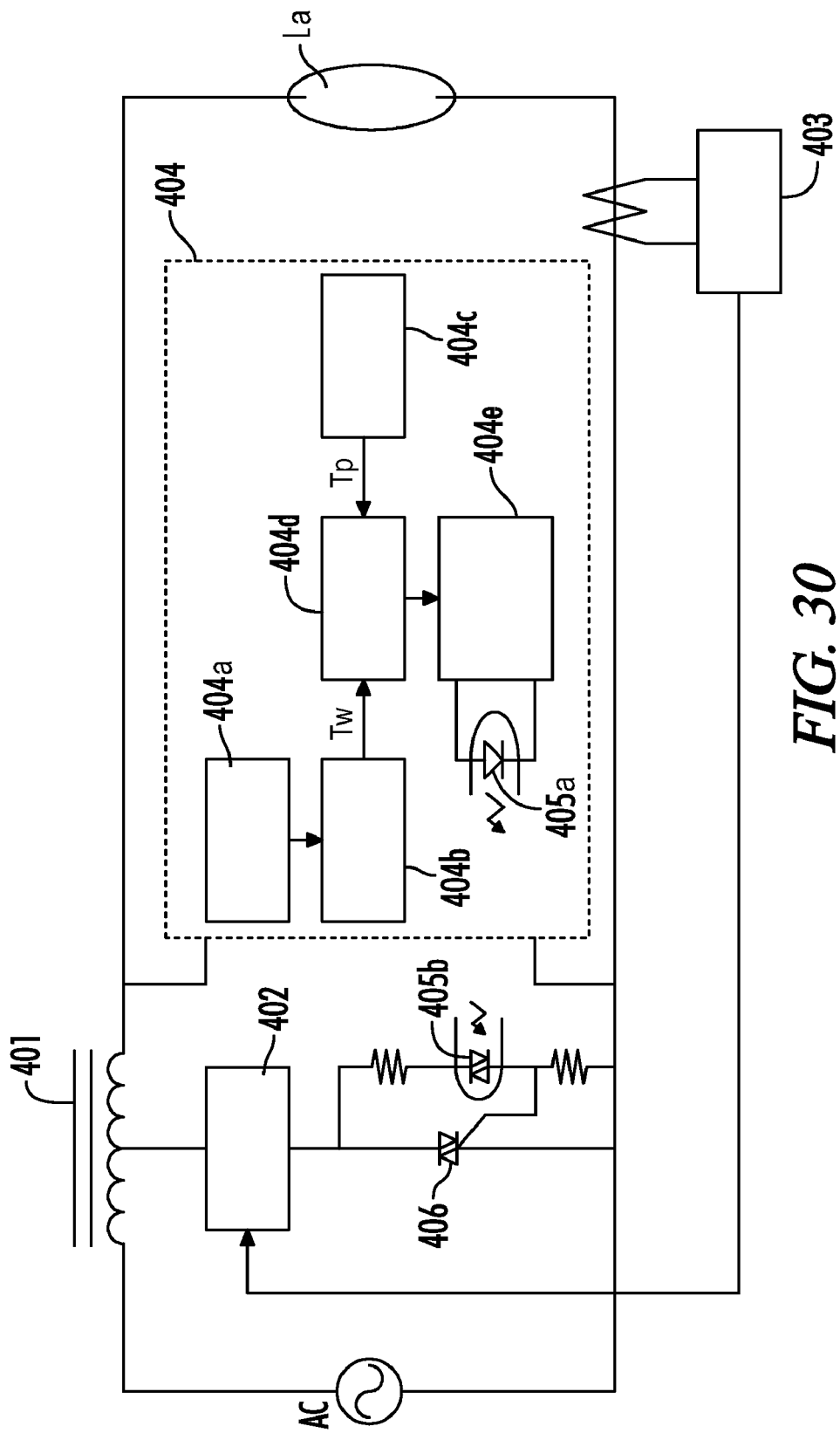
FIG. 30 is a block diagram of another high-pressure lamp ballast as known in the prior art.
Figure 31:
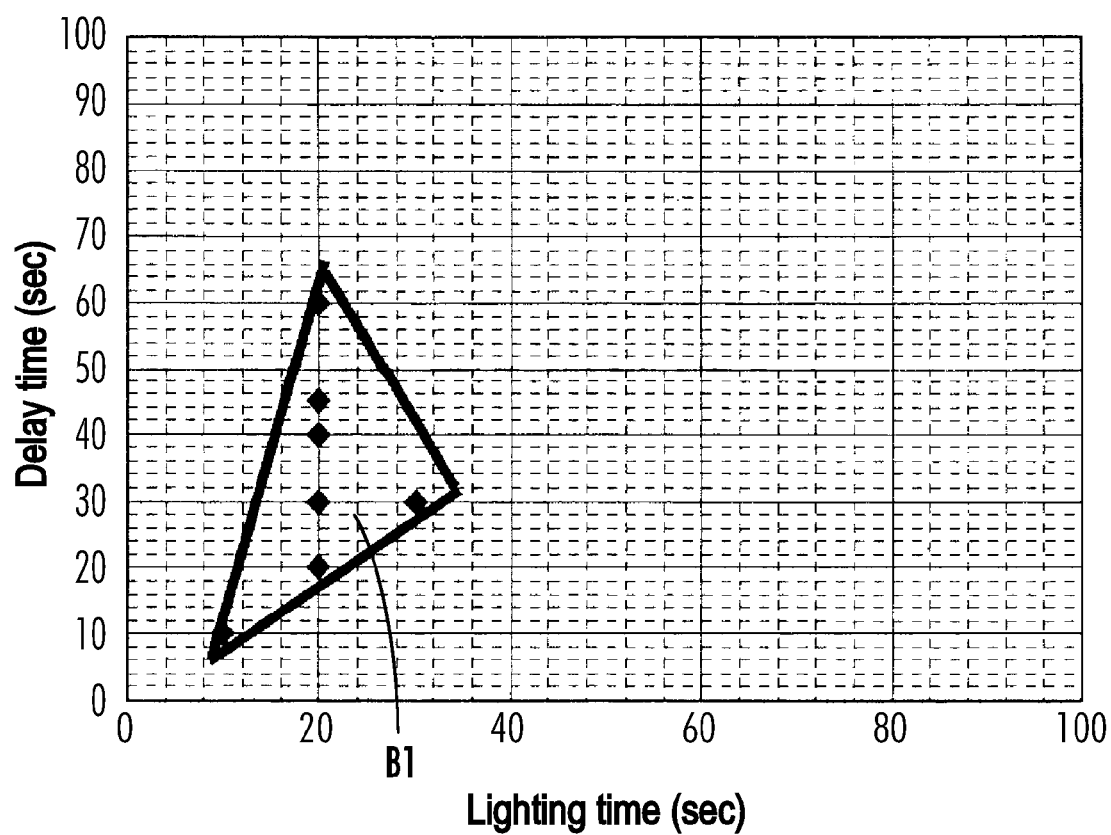
FIG. 31 is a diagram showing a relation between the lighting time and the delay time of the high-pressure lamp ballast of FIG. 30.

Referring now to FIG. 2, a detailed circuit configuration of an embodiment of the ballast is shown. The electric power supply circuit PS includes: a rectifier circuit DB1 for rectifying the commercial power source AC; a step-up chopper circuit 1 for stepping up the rectified voltage of the rectifier circuit DB1 and outputting it; a step-down chopper circuit 2 for stepping down the output voltage of the step-up chopper circuit 1 and outputting a desired electric power; and an inverter circuit 3 for converting a DC output of the step-down chopper circuit 2 into a rectangular wave AC voltage and applying it to the high-pressure discharge lamp La. Each of these circuit configurations are similar to configurations of the typical example as shown in FIG. 22, and further explanations of them are omitted as redundant.

A starting voltage generation circuit 4 in the present embodiment is generally similar to that of the configuration in FIG. 22, except that it includes a photo-thyristor PC1b connected in series with resistor R1, and controls a charging time for capacitor C4 by being driven to turn on by a light-emitting diode PC1a provided in a below-mentioned control circuit 5.

The control circuit 5 of the present embodiment includes: a step-up chopper control module 51; a step-down chopper control module 52; a lighting transition module 53; an inverter control module 54; a lighting time count module 55; a comparison module 56; a delay time setting module 57; a start voltage control module 58; and the light-emitting diode PC1a mentioned above. Operations of the step-up chopper control module 51, the step-down chopper control module 52, the lighting transition module 53, and the inverter control module 54 are the same as those of the conventional example shown in FIG. 22, respectively, and their explanations are omitted.

The lighting time count module 55 measures an elapsed time (lighting time) after the high-pressure discharge lamp La is turned on according to the determination of the lighting transition module 53. The comparison module 56 compares the lighting time measured by the lighting time count module 55 with a below-mentioned reference time Ta1 (a first reference time). The delay time setting module 57 sets up the delay time of the start voltage generation circuit 4 at the time of the next startup according to the comparison result of the comparison module 56. Then, the start voltage controller module 58 drives the light-emitting diode PC1a based on the delay time from the delay time setting module 57, and controls a start time of the start voltage generation circuit 4. The light-emitting diode PC1a is photo-coupled to the photo-thyristor PC1b of the start voltage generation circuit 4, which turns on the photo-thyristor PC1b upon energizing of the light-emitting diode PC1a, and thereby the capacitor C4 is charged to initiate the start of the high-pressure discharge lamp La.

Figure 3:
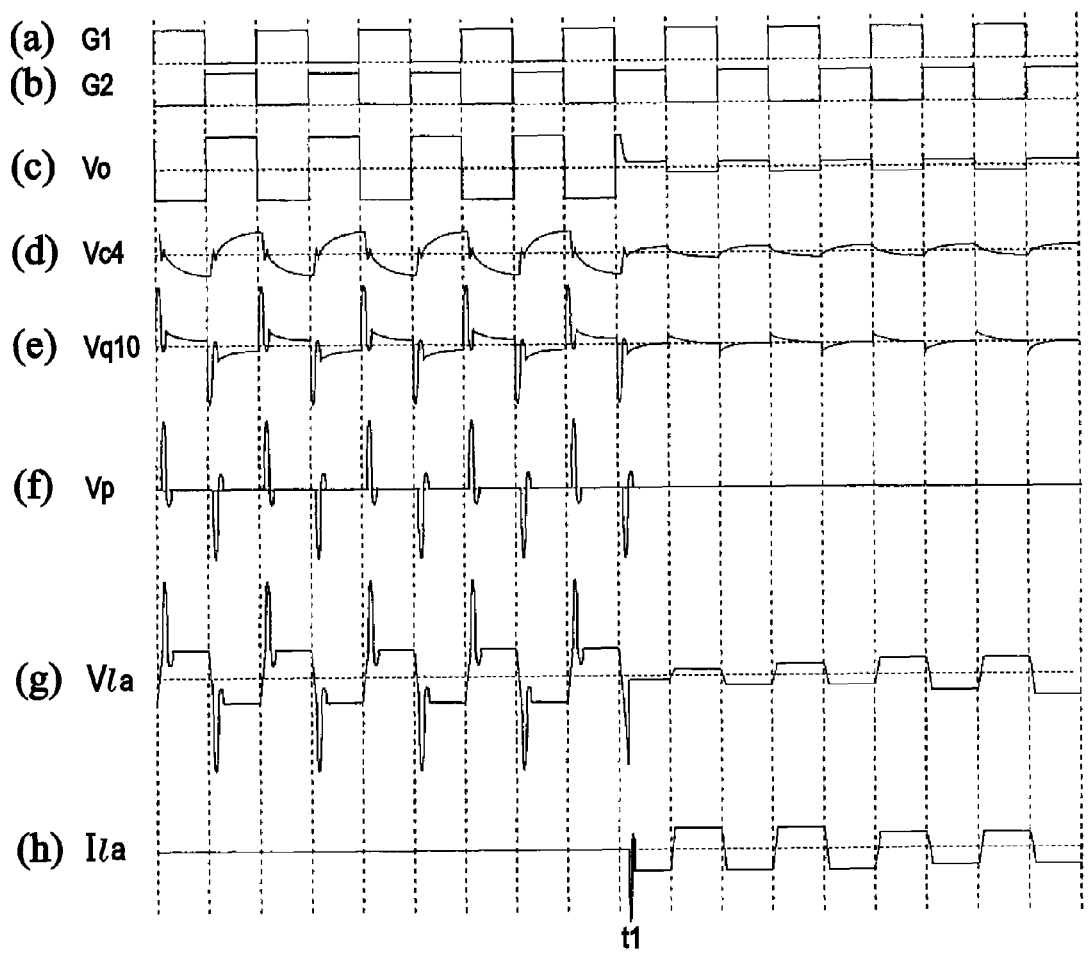
FIGS. 3(a) to (h) are diagrams each showing a waveform of each module of the embodiment of FIG. 1.
Figure 4:
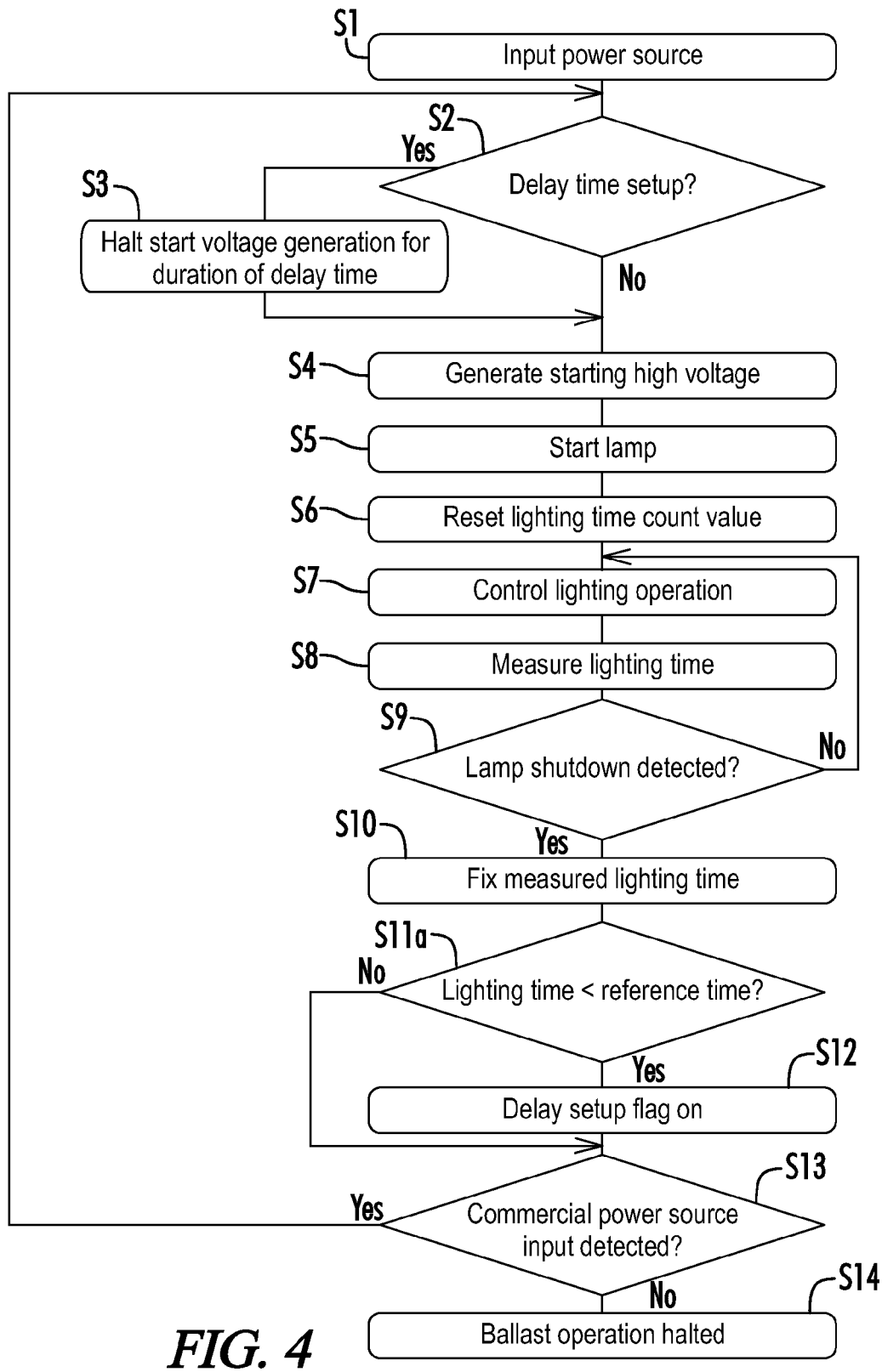
FIG. 4 is a an operational flowchart of the embodiment of FIG. 1.

Hereafter, operations of the present embodiment will be explained using the waveform diagrams of FIGS. 3(a) to (h) and the flowchart of FIG. 4. The explanation will begin from a start voltage generating operation of Step S4 in the flowchart of FIG. 4.

After the below-mentioned Steps S1 to S3 are performed, the start voltage generating operation is initiated and the starting high voltage is applied to the high-pressure discharge lamp La in an unlit state (S4). First, the step-down chopper circuit 2 outputs a higher DC voltage than that at the time of lighting of the high-pressure discharge lamp La, so as to properly start the high-pressure discharge lamp La. Then, as shown in FIGS. 3(a), (b), drive signals G1, G2 of the respective switching elements Q4, Q5 and the switching elements Q3, Q6 of the inverter circuit 3 alternately turn on and off, which makes the switching elements Q3, Q6 and the switching elements Q4, Q5 alternately turn on and off. Therefore an output of the inverter circuit 3 becomes a rectangular wave AC voltage Vo as shown in FIG. 3(c).

When the capacitor C4 of the start voltage generation circuit 4 is charged by the rectangular wave AC voltage Vo so that a voltage Vc4 across the capacitor C4 becomes as shown in FIG. 3(d), the voltage Vq10 across switching element Q10 as shown in FIG. 3(e) rises. When the voltage Vq10 exceeds a predetermined voltage, the switching element Q10 is subjected to breakdown and becomes conductive. An amplitude of the rectangular wave AC voltage Vo is substantially the same as an output voltage Vc3 of the step-down chopper circuit 2. Denoting the output voltage of the step-down chopper circuit 2 as Vc3 and the voltage across capacitor C4 by Vc4, the voltage Vo across switching element Q10 at the time of stability of the rectangular wave AC voltage (except the time of polarity inversion) becomes |Vc3|−Vc4|, and does not reach the breakdown voltage of the switching element Q10. The switching element Q10 thus remains turned off. However, when the polarity of the rectangular wave AC voltage Vo is inverted, the voltage Vc4 does not change rapidly because of being charged through a resistor R1, a voltage |Vc3|+|Vc4| is applied to both ends of the switching element Q10, the voltage across the switching element Q10 reaches the breakdown voltage, and the switching element Q10 turns on.

When the switching element Q10 becomes conductive, a steep pulsed current flows in a primary winding N1 of a pulse transformer T1 by using the capacitors C3, C4 as a power source, and a high-pressure pulse Vp as shown in FIG. 3(f) is generated in a secondary winding N2 of the pulse transformer T1.

A lamp voltage Vla shown in FIG. 3(g) that is the rectangular wave AC voltage Vo output by the inverter circuit 3, with the high-pressure pulse of the start voltage generation circuit 4 superimposed thereon, is applied across the high-pressure discharge lamp La, and the high-pressure discharge lamp La starts at time t1 (S5). When the lighting transition module 53 detects the start of the high-pressure discharge lamp La, the lighting time count module 55 resets its count value (S6). In the step-down chopper control module 52, a step-down output detection circuit 52a detects the output voltage Vc3 of the step-down chopper circuit 2, and a step-down chopper control circuit 52b controls an output current of the step-down chopper circuit 2 (corresponding to a lamp current Ila of FIG. 3(h)) to be a predetermined current that depends on the output voltage Vc3, supplies the proper electric power to the high-pressure discharge lamp La, and thereby lights the high-pressure discharge lamp La in a stable fashion (S7).

When the lighting time count module 55 detects the start of the high-pressure discharge lamp La as a result of the lighting transition module 53, it measures the lighting time that follows the startup (S8).

Operation of the ballast when the high-pressure discharge lamp La is shut down from a turned-on state can now be explained. First, when the high-pressure discharge lamp La is shut down, the lighting transition module 55 detects the shutdown of the high-pressure discharge lamp La as a result of the lighting transition module 53 (S9), and halts measurement of the lighting time, which also has the effect of fixing the measured lighting time (S10).

Figure 5:
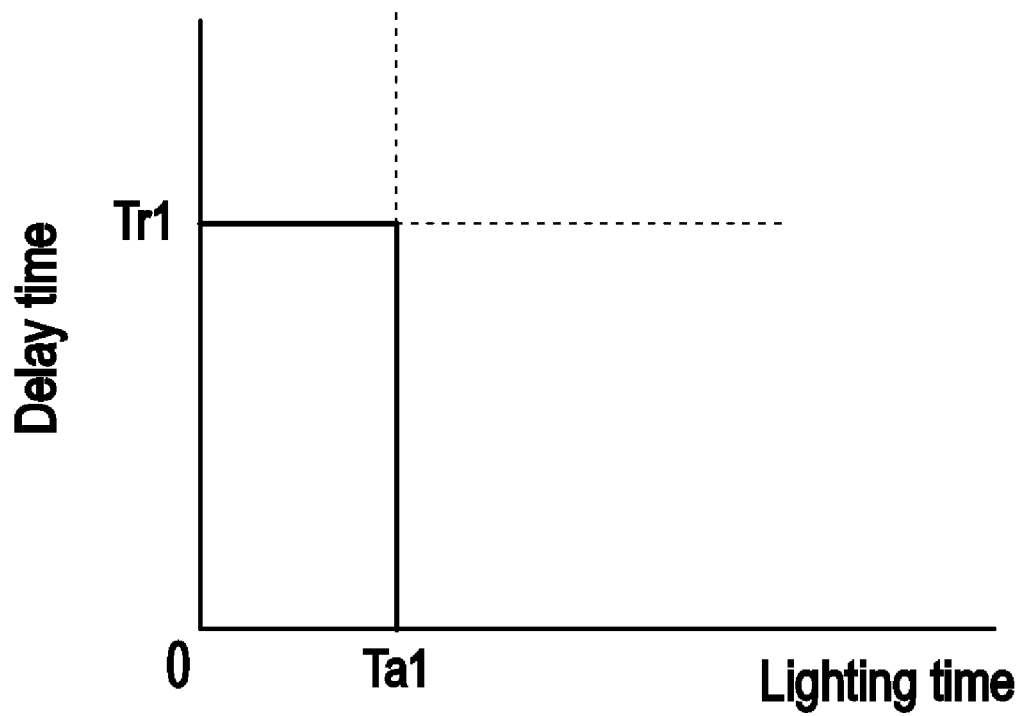
FIG. 5 is a diagram showing a relation between a lighting time and a delay time of the embodiment of FIG. 1.

Next, the comparison module 56 compares the lighting time measured by the lighting time count module 55 with the reference time Ta1 (e.g., 1 minute) and outputs the comparison result to the delay time setting module 57. In addition, the delay time setting module 57 determines whether a delay time Tr1 in the next start control (e.g., about 10 minutes) may be set based on the given comparison result (S11a). When the lighting time is less than the reference time Ta1, a delay setup flag is turned on and operation proceeds to Step S13 (S12); when the lighting time is the reference time Ta1 or more, operation proceeds to Step S13, without turning on the delay setup flag. Here, a relation between the lighting time and the delay time is shown in FIG. 5. When the lighting time is less than the reference time Ta1, the delay time is set to Tr1 (delay setup flag: on), and when the lighting time is the reference time Ta1 or more, the delay time is set to "0" (delay setup flag: off). Incidentally, the delay setup flag may be stored in nonvolatile memory, such as EEPROM, of a microcomputer, and even when the supply of the AC power source AC to the high-pressure lamp ballast is interrupted, a state of the delay setup flag is maintained.

Next, the start voltage control module 58 determines whether there is a supply of the commercial power source AC (S13). This determination may be implemented by a method in which an input voltage or an output voltage of the rectifier circuit DB1 is monitored, and a method in which a voltage value of the control power source converted from the commercial power source AC by a power source circuit (not shown) is monitored. When there is no supply voltage from the commercial power source AC, it is determined that an intentional shutdown operation such as turning off a light switch (not shown) has occurred, and operation proceeds to halt operation of the ballast (S14). When there still is a supply voltage from the commercial power source AC at Step S13, it may be assumed that improper shutdown of the high-pressure discharge lamp La occurred for some reason, or the high-pressure discharge lamp La shut down because the commercial power source AC produced an instantaneous power interruption, such as an arc, of such an extremely short duration as could maintain the operation of the control circuit 5, and operation proceeds to Step S2.

When a light switch or equivalent manual device is turned on to initiate startup of the high-pressure discharge lamp La (S1), or when the restart initiation instruction occurs as a trigger after it is determined that the lighting failure or instant power interruption of the high-pressure discharge lamp La has occurred at Step S13, the start voltage control module 58 determines a state of the delay setup flag and determines the existence/absence of the delay setup of the start operation (S2). If the delay setup flag is on, having determined that the delay setup of the start operation is done, the start voltage control module 58 halts driving of the light-emitting diode PC1a in a period from the occurrence of a trigger of the above-mentioned start initiation or of a restart initiation instruction to the lapse of the delay time. The photo-thyristor PC1b of the start voltage generation circuit 4 is not turned on during this time (S3). In a state where the photo-thyristor PC1b is not turned on, since a charging path of the capacitor C4 is interrupted, the switching element Q10 does not turn on and the starting high voltage is not generated.

When the delay time Tr1 elapses, the start voltage control module 58 drives the light-emitting diode PC1a to make the photo-thyristor PC1b of the start voltage generation circuit 4 turn on, and initiates the start voltage generating operation of applying the starting high voltage to the high-pressure discharge lamp La. Moreover, at Step S2, if the delay setup flag is off, it may be determined that the delay setup of the start operation has not been done, and operation proceeds to Step S4 and the start voltage generating operation is initiated quickly (S4).

Even in the case where an amalgam and an iodide adhere to a tube wall of the high-pressure discharge lamp La because the previous lighting time is short (less than the reference time Ta1), and thereby the inside of an arc tube of the high-pressure discharge lamp La becomes unstable, the lamp La gradually returns to a stable initial state during the delay time Tr1. Therefore even when the restart is performed immediately after the high-pressure discharge lamp La has been on for a short time, it becomes possible to restart it in steady state.

Figure 6:
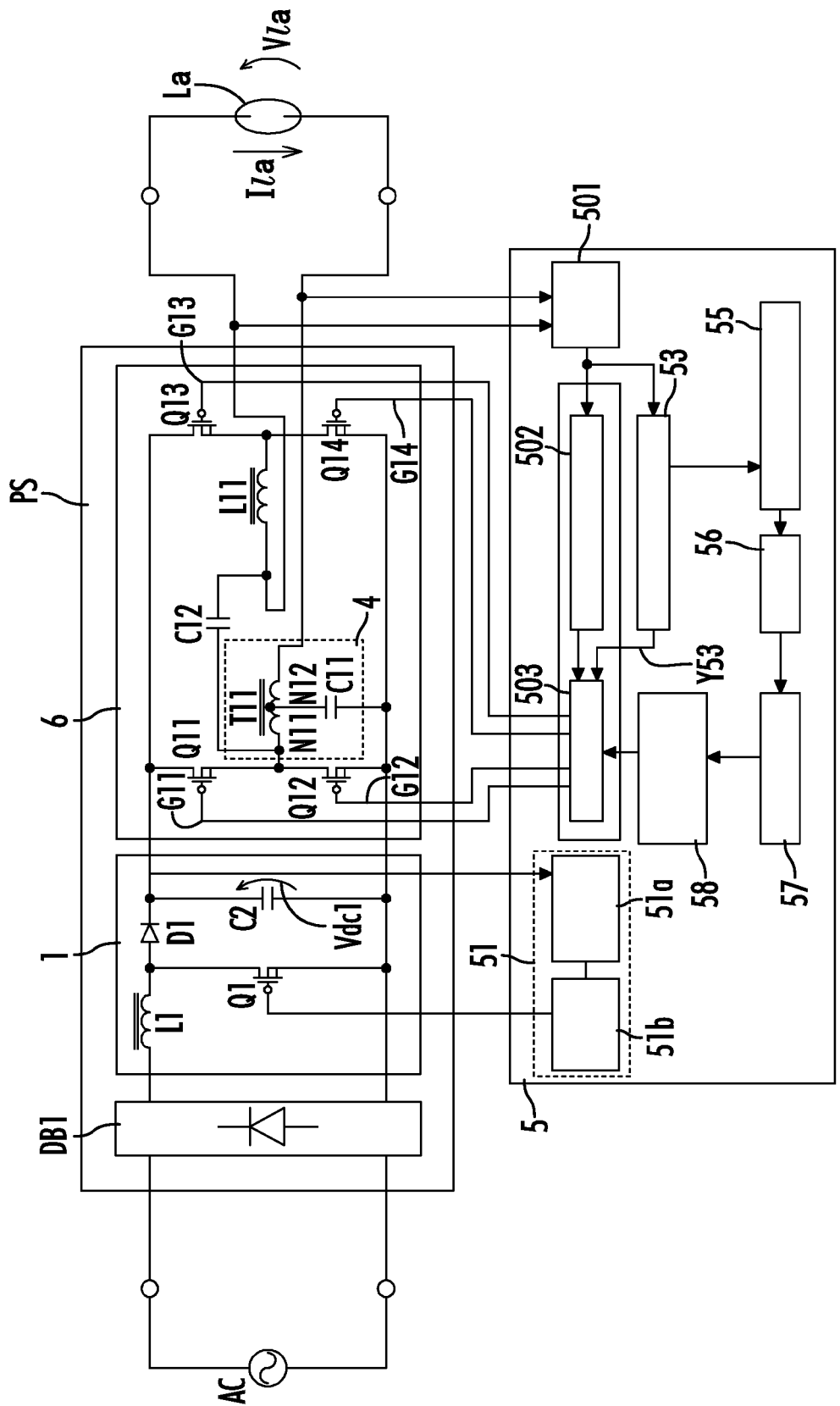
FIG. 6 is a diagram showing a circuit configuration of another embodiment of the high-pressure lamp ballast of the present invention.

Referring now to FIG. 6, a high-pressure lamp ballast of another embodiment of the present invention is shown. The ballast of this embodiment also includes an electric power supply circuit PS, a start voltage generation circuit 4, and a control circuit 5.

The electric power supply circuit PS includes a rectifier circuit DB1 for rectifying the commercial power source AC and a step-up chopper circuit 1 for stepping up the rectified voltage of the rectifier circuit DB1 and outputting it. Operation of these circuits is as previously described and their explanations are accordingly omitted. The power supply circuit PS further includes an inverter-type step-down chopper circuit 6 for converting an output voltage Vdc1 of the step-up chopper circuit 1 into a rectangular wave AC voltage and applying it to the high-pressure discharge lamp La.

The inverter type step-down chopper circuit 6 includes: a series circuit of switching elements Q11, Q12 and a series circuit of switching elements Q13, Q14 that are connected in parallel to the capacitor C2 of the step-up chopper circuit 1; and a series circuit of an inductor L11 and the capacitor C12 that are connected between connection midpoints of the switching elements Q3, Q4 and the switching elements Q5, Q6.

The start voltage generation circuit 4 includes a resonance circuit of a pulse transformer T11 (series circuit of a primary winding N11 and a secondary winding N12) having one end connected to a connection midpoint of the switching elements Q11, Q12 and a capacitor C11 having one end connected to a connection midpoint of the primary winding N11 and the secondary winding N12, and having another end connected to a low voltage side of the capacitor C2. The start voltage generation circuit 4 further generates a resonance step-up voltage by controlling the switching elements Q11 to Q14, and applies it to the high-pressure discharge lamp La as the starting high voltage.

One end of the high-pressure discharge lamp La is connected to the connection midpoint of the switching elements Q11, Q12 through the pulse transformer T11, and the other end thereof is connected to the midpoint of the switching elements Q13, Q14 through the inductor L11.

The control circuit 5 of the embodiment shown in FIG. 6 includes various modules that are equivalent to the embodiment of FIG. 1 and do not require further explanation, such as: the step-up chopper control module 51; the lighting transition module 53; the lighting time count module 55; the comparison module 56; the delay time setting module 57; and the start voltage control module 58. However, the control circuit 5 of the embodiment as shown in FIG. 6 further includes a lamp voltage detection circuit 501, a lighting mode control circuit 502, and a switching circuit 503.

The lamp voltage detection circuit 501 measures and outputs the lamp voltage Vla, and the lighting transition module 53 identifies startup and shutdown of the high-pressure discharge lamp La based on the measurement result of the lamp voltage Vla.

The switching circuit 503 switches an operating mode of the inverter-type step-down chopper circuit 6 to either a start mode for generating the starting high voltage to be applied to the high-pressure discharge lamp La or to a lighting mode for powering the high-pressure discharge lamp La in steady state, based on the determination of the lighting transition module 53. In the start mode, the start timing of the start voltage generation circuit 4 at the time of startup is controlled by the start voltage control module 58.

Further, the lighting mode control circuit 502 controls operations of the switching elements Q11 to Q14 in the lighting mode through the switching circuit 503 based on the measurement result of the lamp voltage Vla by the lamp voltage detection circuit 501.

Operation of the ballast of the present embodiment will now be explained using the waveform diagrams of FIGS. 7(a) to (i) and the flowchart of FIG. 4. The explanations will be given starting from the start voltage generating operation at Step S4 in the flowchart of FIG. 4.

Figure 7:
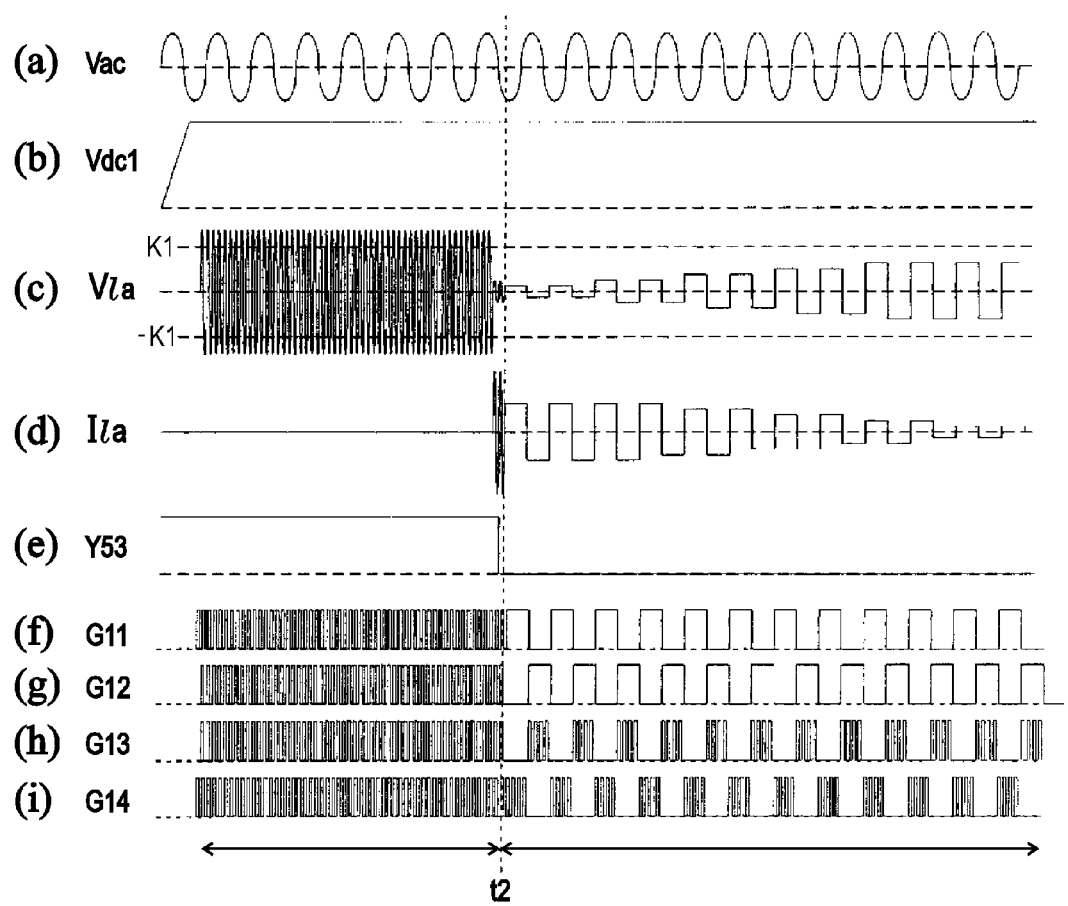
FIGS. 7(a) to (i) are diagrams each showing a waveform of each part of the embodiment of FIG. 6.

After processing of below-mentioned Steps S1 to S3 is performed, the start voltage generating operation that applies the starting high voltage to the high-pressure discharge lamp La in an unlit state is initiated (S4). First, in response to the output voltage Vdc1 of the step-up chopper circuit 1 to which the commercial power source AC (AC voltage Vac) shown in FIG. 7(a) is supplied, the step-up chopper control module 51 of the control circuit 5 controls the output voltage Vdc1 to be constant both at the time of startup and at the time of shutdown of the high-pressure discharge lamp La, as shown in FIG. 7(b). This control is carried out by driving on and off the switching element Q1 of the step-up chopper circuit 1 at a frequency of about 30 kHz. Moreover, the step-up chopper circuit 1 also serves to improve a power factor and control input distortion.

When the output voltage Vdc1 of the step-up chopper circuit 1 reaches the predetermined voltage, the inverter type high voltage chopper circuit 6 starts an operation. At this time, the high-pressure discharge lamp La is in the unlit state and can be considered to be in an open state, whose equivalent impedance is high and near infinity. The switching circuit 503 drives the switching elements Q11 to Q14 of the inverter-type high voltage chopper circuit 6 in its start mode, which causes the switching elements Q11 to Q14 to turn on and off alternately at a predetermined frequency f0 (about a few 100 kHz). (FIGS. 7(f) to (i) show drive signals G11 to G14 of the respective switching elements Q11 to Q14). This frequency f0 is a frequency near the resonant frequency fr of a resonant circuit including the primary winding N11 of the pulse transformer T11 of the start voltage generation circuit 4 and the capacitor C11, and a high sinusoidal voltage is generated in the primary winding N11. This high sinusoidal voltage is stepped up according to a turns ratio of the primary winding N11 and the secondary winding N12, and when the stepped-up starting high voltage is applied to the high-pressure discharge lamp La through the capacitor C12 as shown in FIG. 7(c), the high-pressure discharge lamp La starts at time T2 (S5).

The high-pressure discharge lamp La after startup approaches a low impedance state close to short circuit, and the lamp voltage Vla falls to substantially 0 V. When the measurement result of the lamp voltage detection circuit 501 goes below thresholds k1, −k1 (refer to FIG. 7(c)), the lighting transition module 53 determines that the high-pressure discharge lamp La is lit and switches a lighting transition signal Y53 (refer also to FIG. 6) further provided to the switching circuit 503 to a Low level from a High level as shown in FIG. 7(e).

When the lighting time count module 55 determines that the high-pressure discharge lamp La is lit based on the lighting transition signal Y53, the count value is reset (S6), and further when the switching circuit 503 determines that the high-pressure discharge lamp La is lit based on the lighting transition signal Y53, an operation of the inverter type step-down chopper circuit 6 is switched from the start mode to the lighting mode and lighting control is performed (S7).

The switching circuit 503 in the lighting mode drives on and off the switching elements Q11, Q12 alternately at about 30 kHz, further drives on and off the switching element Q13 at about 300 kHz when the switching element Q12 is in on state, and further drives on and off the switching elements Q14 at about 300 kHz when the switching element Q11 is in on state. By the above-mentioned operation of the switching elements Q11 to Q14, the rectangular wave AC voltage of about 30 kHz is applied to the high-pressure discharge lamp La. The lamp voltage Vla of the high-pressure discharge lamp La is low immediately after startup and gradually increases as the inside of the arc tube becomes high in temperature and pressure to reach a steady state voltage. The lamp current Ila of the high-pressure discharge lamp La is high immediately after startup and gradually decreases as the inside of the arc tube becomes high in temperature and pressure (refer to FIGS. 7(c), (d)).

The lighting mode control circuit 502 controls a switching frequency and an on-time of the switching elements Q13, Q14 based on the measurement result of the lamp voltage by the lamp voltage detection circuit 501, supplies the proper electric power to the high-pressure discharge lamp La, and powers the high-pressure discharge lamp La in the lighting mode in steady state.

Then, when the start of the high-pressure discharge lamp La is detected based on the transition result of the lighting transition module 53, the lighting time count module 55 measures the lighting time after the start (S8).

Operation in the case where the high-pressure discharge lamp La is shut down from the lighting state will now be explained.

First, when the high-pressure discharge lamp La is shut down, the lighting time count module 55 detects an unlit state of the high-pressure discharge lamp La based on the transition result of the lighting transition module 53 (S9), and halts measurement of the lighting time, which fixes the lighting time at the time already measured (S10).

Next, the comparison module 56 compares the measurement result of the lighting time by the lighting time count module 55 with the reference time Ta1 (e.g., 1 minute), and outputs the comparison result to the delay time setting module 57. Then the delay time setting module 57 determines whether the delay time Tr1 in the next time start control (e.g. about 10 minutes) may be set up based on the comparison result (S11a). If the lighting time is less than the reference time Ta1, the delay setup flag is turned on, and operation proceeds to Step S13 (S12); if the lighting time is the reference time Ta1 or more, the delay setup flag is not turned on, and operation proceeds to Step S13. That is, a relation between the lighting time and the delay time is shown in FIG. 5, in which the delay time is set to Tr1 when the lighting time is less than the reference time Ta1 (delay setup flag: on), and the delay time is set to "0" when the lighting time is the reference time Ta1 or more (delay setup flag: off). The delay setup flag is stored in nonvolatile memory, such as EEPROM, of a microcomputer, and even when the supply of the AC power source AC to the high-pressure lamp ballast is interrupted the delay setup flag maintains its state.

Next, the start voltage control module 58 determines whether there is a present supply from the commercial power source AC (S13). This determination is made by monitoring the input voltage or output voltage of the rectifier circuit DB1 and monitoring a voltage value of the control power source converted from the commercial power source AC. When there is no supply voltage from commercial power source AC, it is considered that the supply has been manually shut down, and the lamp halts operation (S14). On the other hand, if there is a supply voltage from the commercial power source AC at Step S13, it is considered that the shutdown of the high-pressure discharge lamp La occurs for some other cause, or that the high-pressure discharge lamp La failed because of an instantaneous power interruption or other voltage failure of the commercial power source AC for such an extremely short time that operation of the control circuit 5 may be maintained, and operation proceeds to Step S2.

When a light switch or equivalent manual device is turned on to trigger startup of an unlit high-pressure discharge lamp La (S1), or when the restart initiation instruction is received as a trigger after it was determined that the shutdown of the high-pressure discharge lamp La or an instant power interruption occurred at Step S13, the start voltage control module 58 determines a state of the delay setup flag and determines the existence/absence of the delay setup of the start operation (S2). If the delay setup flag is set on, and upon determining that the delay setup of the start operation is done, the start voltage control module 58 instructs the switching circuit 503 to maintain the switching elements Q11 to Q14 all in the off state for a time period from occurrence of a trigger as mentioned above until the delay time passes (S3). In a state where the switching elements Q11 to Q14 are in the off state, the starting high voltage is not generated.

When the delay time Tr1 has passed, the start voltage control module 58 instructs the switching circuit 503 so as to drive the switching elements Q11 to Q14 in a start mode, and initiates the start voltage generating operation of applying the starting high voltage to the high-pressure discharge lamp La by the start voltage generation circuit 4. Moreover, at Step S2, if the delay setup flag is set off, it is determined that the delay setup of the start operation is not performed, and operation proceeds to Step S4, and the start voltage generating operation is initiated rapidly (S4).

However, even in the case where the amalgam and iodide adhere to the tube wall of the high-pressure discharge lamp because the previous lighting time is short (less than the reference time Ta1) and the inside of the arc tube of the high-pressure discharge lamp La becomes unstable, the lamp La gradually returns to the stable initial state during the delay time Tr1, and it becomes possible to safely perform the restart even when the restart is done immediately after the high-pressure discharge lamp has been lit for a short time.

Figure 8:
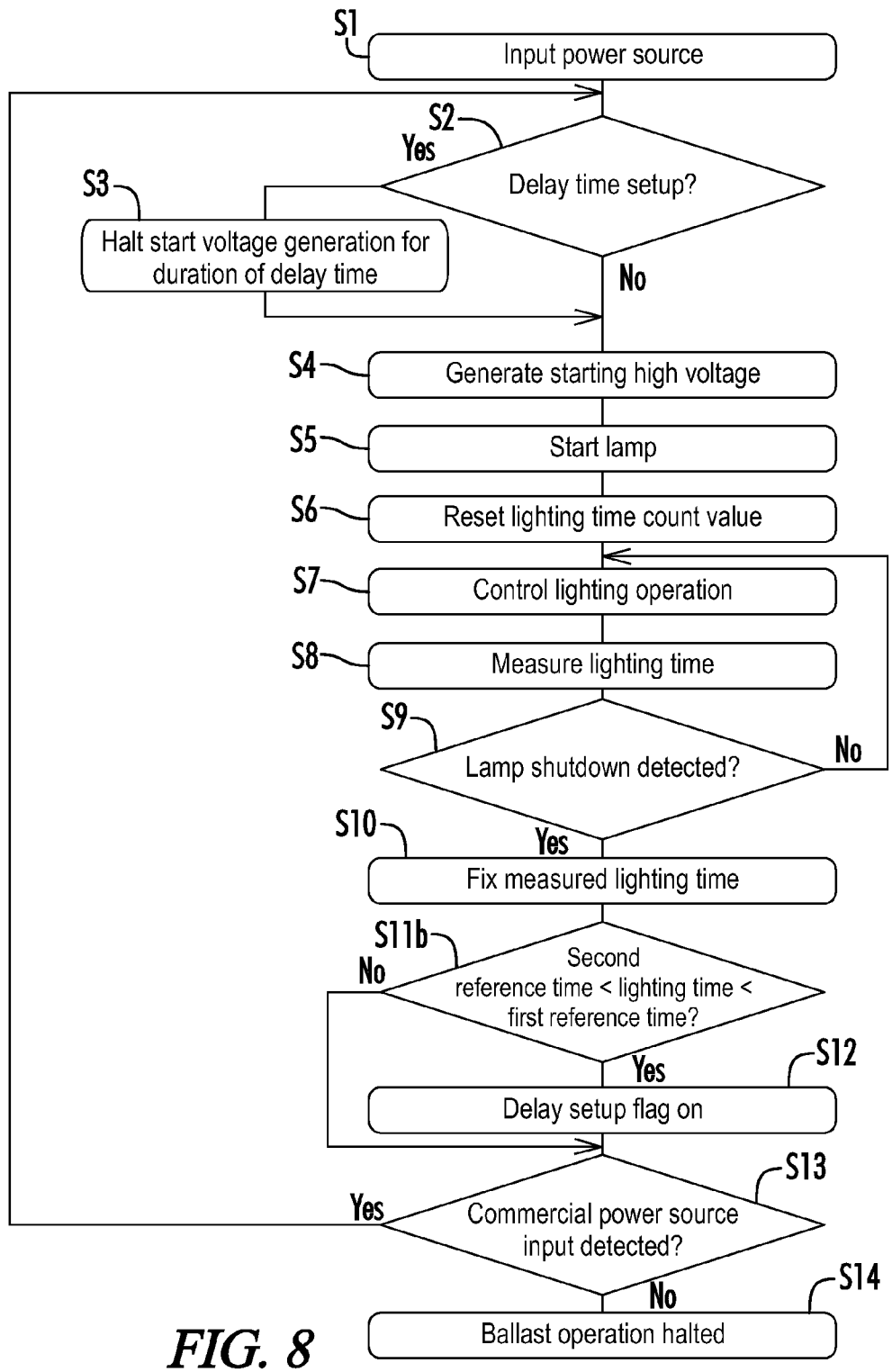
FIG. 8 is an operational flowchart of another embodiment of the high-pressure lamp ballast of the present invention.

In another embodiment of the high-pressure lamp ballast of the present invention as shown in a flowchart of FIG. 8 and having substantially the same configuration as the ballast of FIG. 6, a comparison process of the comparison module 56 at Step S11b may be different from that of the embodiment previously described shown in FIG. 2.

The comparison module 56 sets reference times that are to be compared with the measured lighting time to two values of the reference time Ta1 (the first reference time), Ta2 (a second reference time) (where Ta2<Ta1, e.g., Ta2=5 seconds and Ta1=1 minute), and outputs the comparison result of the lighting time and the reference times Ta1, Ta2 to the delay time setting module 57 (S11b).

Figure 10:
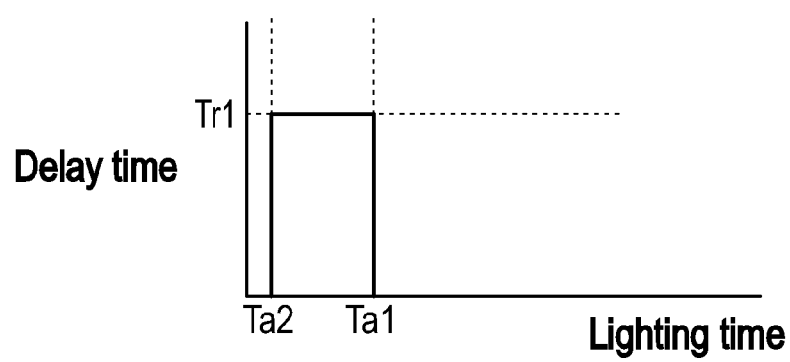
FIG. 10 is a diagram showing a relation between the lighting time and the delay time of the embodiment of FIG. 8.

Then the delay time setting module 57 determines whether the delay time Tr1 in the next start control may be set up based on the comparison result. When the lighting time is longer than a reference time Ta2 and is shorter than the reference time Ta1, the delay setup flag is set on and operation proceeds to Step S13 (S12). When the lighting time is less than or equal to the reference time Ta2, or when it is greater than or equal to the reference time Ta1, operation proceeds to Step S13 without setting on the delay setup flag. That is, a relation between the lighting time and the delay time is as shown in FIG. 10, in which when the lighting time is longer than the reference time Ta2 and is shorter than the reference time Ta1, the delay time is set to "Tr1," and when the lighting time is not more than the reference time Ta2 or when it is not less than the reference time Ta1, the delay time is set to "0."

Figure 9A:
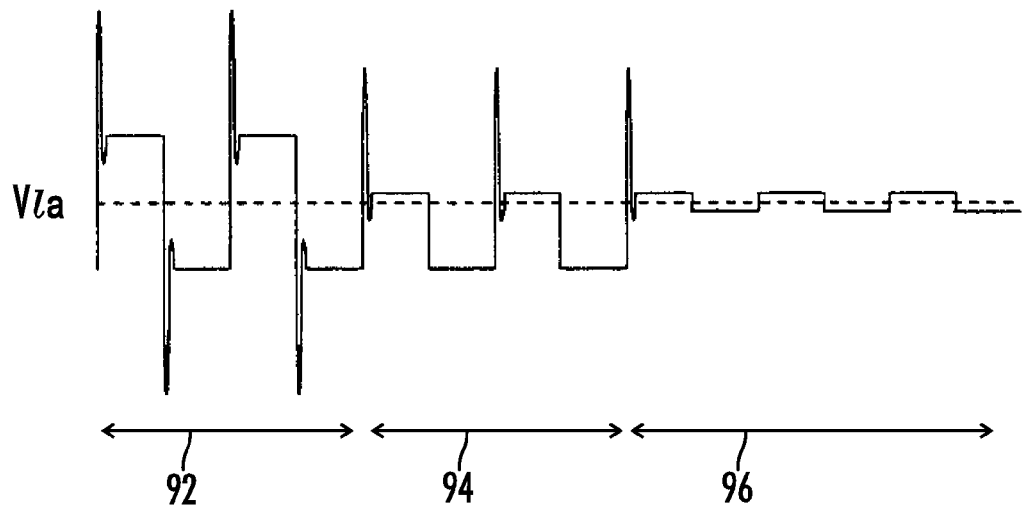
FIGS. 9(a), (b) are diagrams showing lamp voltage waveforms of the embodiment of FIG. 8.
Figure 9B:
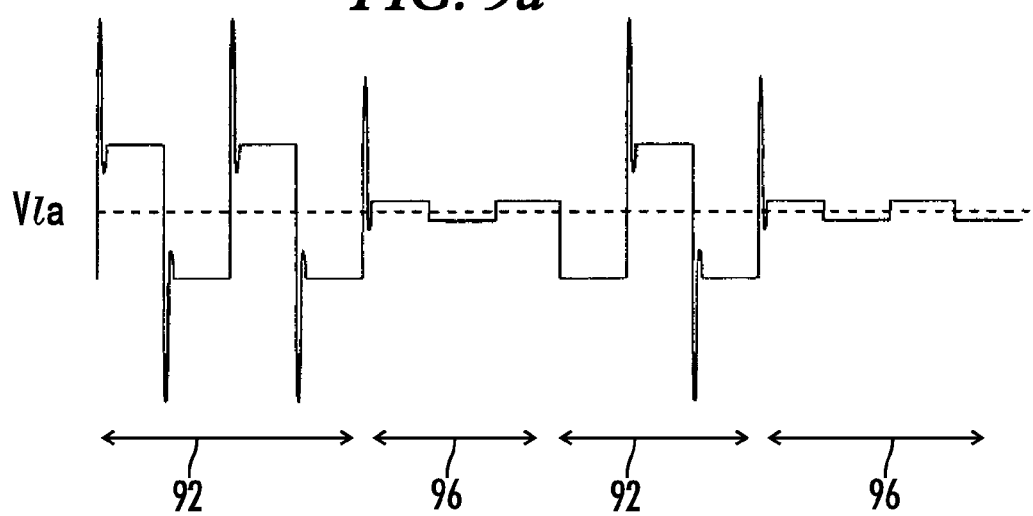

There may be instances where the high-pressure discharge lamp La starts while behaving in an unstable manner as a pattern at startup. For example, as shown in FIG. 9(a), there is a case where, when the start is initiated in an unlit state, the starting high voltage is applied to the lamp by the start voltage generation circuit 4 to cause breakdown, and subsequently, after passing a half-wave discharge period, the lamp continues normal discharge in a normal discharge period and shifts to steady state. Moreover, as shown in FIG. 9(b), there is a case where, after the start is initiated in an unlit state, the start voltage generation circuit 4 applies the starting high voltage to cause breakdown, and the lamp temporarily shifts to a lighting period when normal discharge is performed. The lighting failure occurs quickly and the lamp enters the unlit period. After this the starting high voltage is applied again to cause breakdown, and the lamp continues normal discharge in the normal discharge period and shifts to steady state. Thus unstable behavior patterns are exhibited at startup as shown in both the above-mentioned FIGS. 9(a), (b).

To stabilize and maintain discharge of the high-pressure discharge lamp La, the control module 5 may need to increase transition sensitivity of startup/shutdown by the lighting transition module 53 so as to perform the proper lighting control of the high-pressure discharge lamp La immediately after shifting to the lighting state. However, additional problems may arise in the case where the transition sensitivity of the lighting transition module 53 is raised, to distinguish startup in the half-wave discharge period as shown in FIG. 9(a) and in the lighting period before the lighting failure that occurs immediately after the start as shown in FIG. 9(b), and if the reference time that is to be compared with the lighting time at the comparison module 56 is only one value. There is concern that during the startup process, the lamp may be determined to have shut down after having been lit for a short time, and a delay time is set at the time of restart, and consequently the high-pressure discharge lamp La does not restart quickly.

Thereupon, the present embodiment is so configured that the reference times to be compared with the lighting time at the comparison module 56 are two values, and when the lighting time is the reference time Ta2 or less, the delay time at the time of the restart is not set up. Therefore even when an unstable behavior of the above-mentioned high-pressure discharge lamp La occurs, it is possible to safely restart the high-pressure discharge lamp La without erroneously detecting a shutdown, and further when the high-pressure discharge lamp La is restarted immediately after a short lighting time, it becomes possible to safely restart it.

Figure 11:
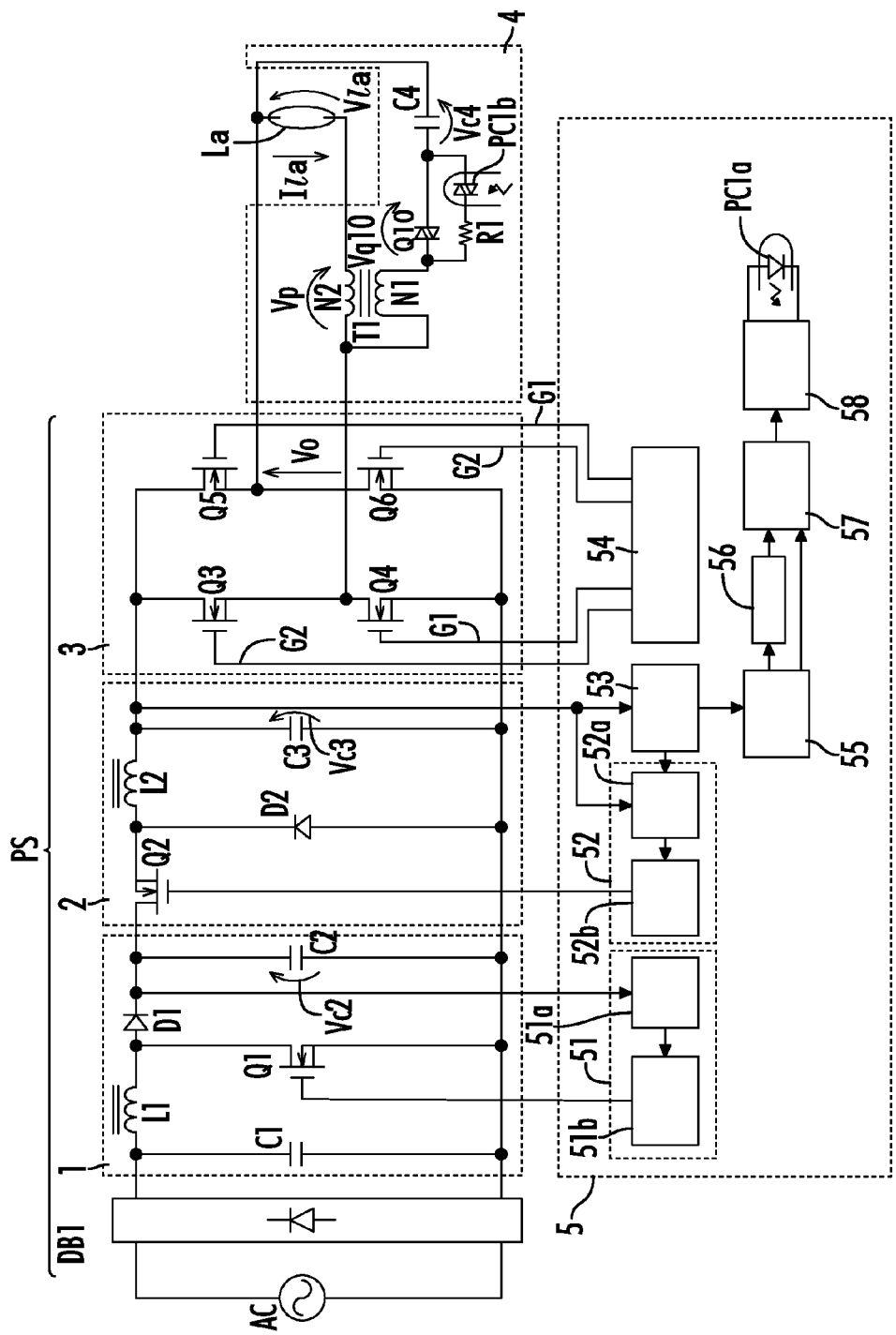
FIG. 11 is a diagram showing a circuit configuration of another embodiment of the high-pressure lamp ballast of the present invention.
Figure 12:
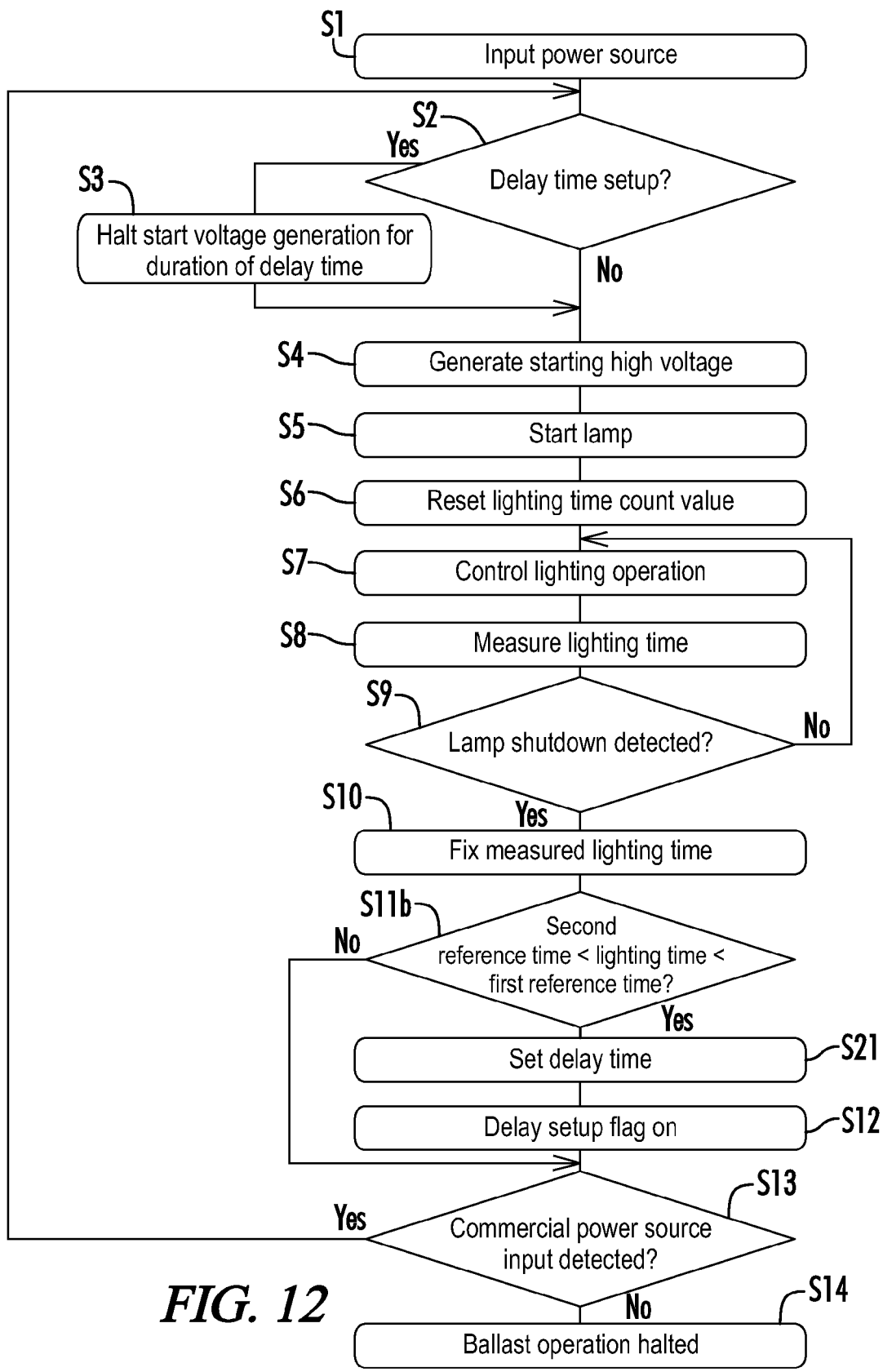
FIG. 12 is an operational flowchart of the embodiment of FIG. 11.

In an embodiment of the high-pressure lamp ballast of the present invention as shown in FIG. 11, the ballast outputs the lighting time measured by the lighting time count module 55 not only to the comparison module 56 but also to the delay time setting module 57, wherein the delay time setting module 57 sets up a delay time that depends on the lighting time. Such an operation is shown in the flow chart of FIG. 12, and differs from the flowchart shown in FIG. 8 in that the delay time setting processing of Step S21 is added.

Figure 13:
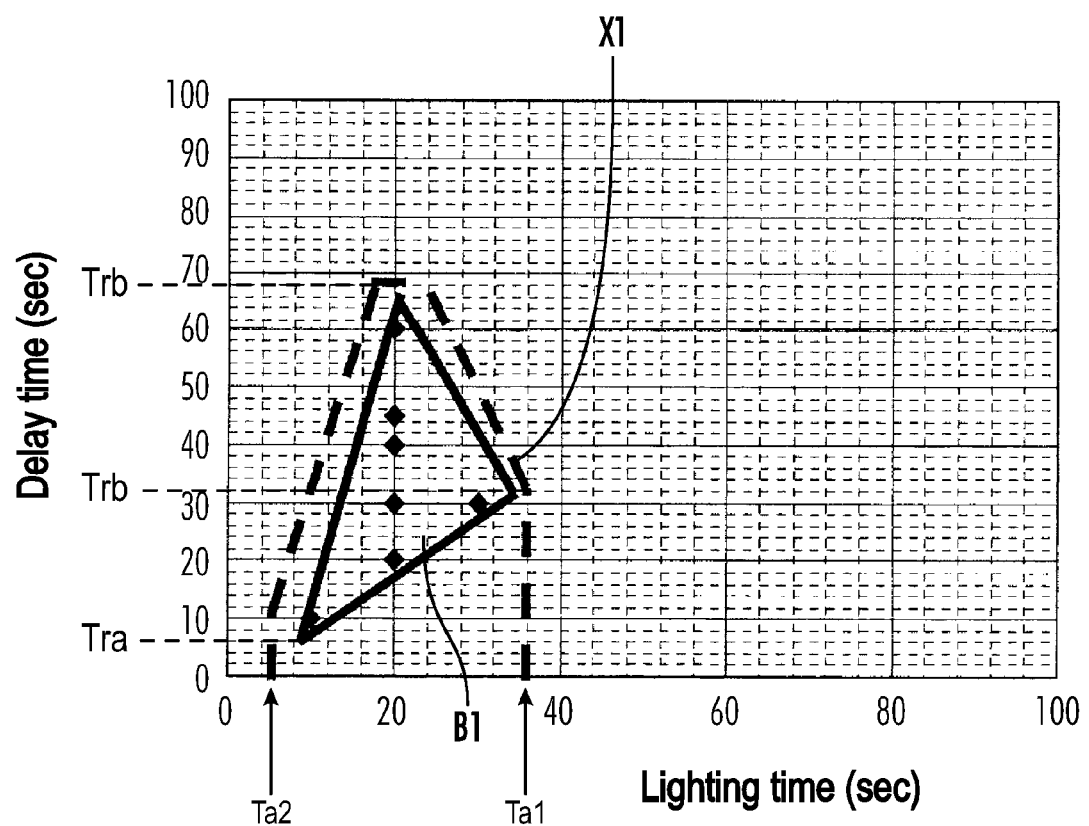
FIG. 13 is a diagram showing a relation between the lighting time and the delay time of the embodiment of FIG. 11.

As shown in a domain B1 in FIG. 13 where the restart fails, when the high-pressure discharge lamp La is lit for a short time, the delay time from shutdown until the starting high voltage is applied in order to make the lamp restart differs depending on the lighting time.

Thereupon, in an embodiment as shown in FIG. 13 a reference time Ta2 shorter than a lower limit value of the lighting time in the domain B1 where the restart fails, and a reference time Ta2 longer than the lighting time in the domain B1 where the restart fails are set up. A delay time characteristic X1 is further set up that connects the reference times Ta1 and Ta2 along an outer circumference of the domain B1. Then the delay time setting module 57 sets up the delay time depending on the lighting time at Step S21 based on the above-mentioned characteristic X1 being set up outside the domain B1. Incidentally, the delay time Tra that is set up when the lighting time is equal to the reference time Ta1, and the delay time Trb that is set up when the lighting time is equal to the reference time Ta2, both become values which are a maximum value Trm of the delay time in the characteristic X1 or less.

Therefore, since the delay time at the restart after a short lighting time can be finely adjusted based on the previous lighting time, it becomes possible to set the delay time to a minimum and prevent an unnecessarily long delay time, and the interval from shutdown to restart can be shortened.

Figure 14:
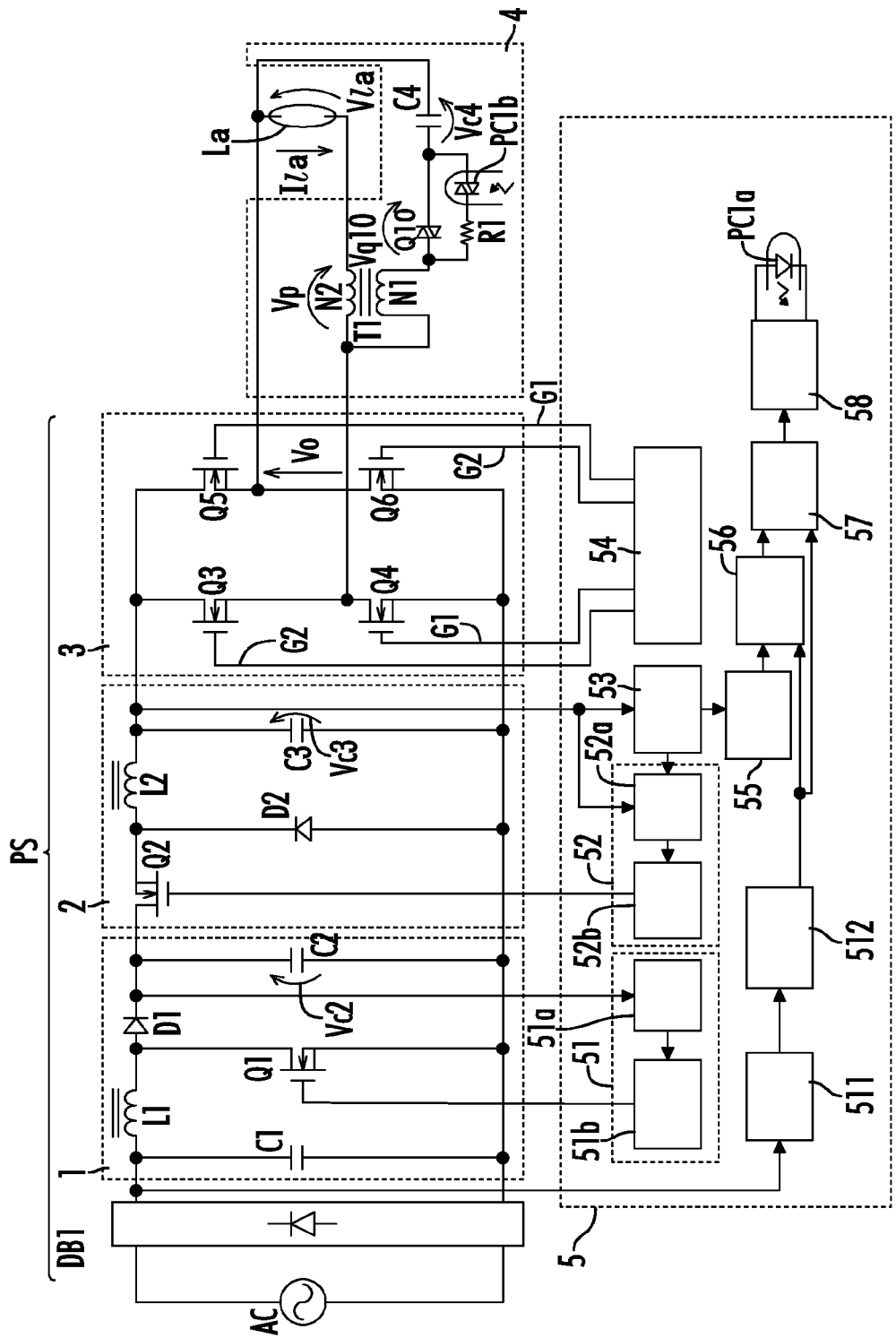
FIG. 14 is a diagram showing a circuit configuration of another embodiment of the high-pressure lamp ballast of the present invention.
Figure 15:
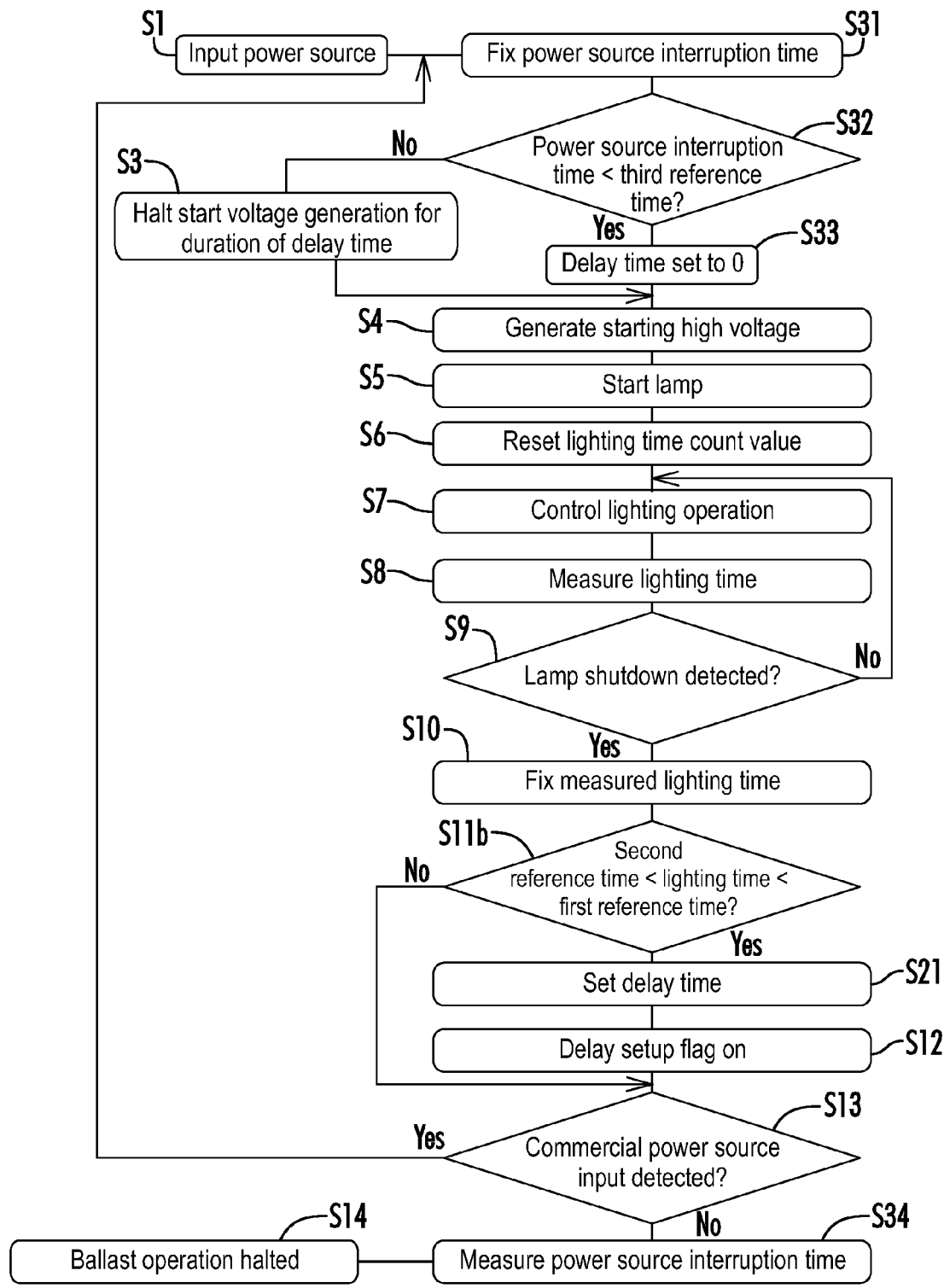
FIG. 15 is a an operational flowchart of the embodiment of FIG. 14.

The high-pressure lamp ballast of an embodiment as shown in FIG. 14 is provided with attention to the fact that when the high-pressure discharge lamp La is restarted within an extremely short time (within about eight seconds) after shutdown, the restart as shown in FIG. 13 is located outside the domain B1 where the restart fails. In the embodiment shown, a commercial power source monitoring module 511 and a power source interruption time count module 512 are provided to the configuration shown in FIG. 11. Their operations are shown in the flowchart of FIG. 15, and it differs from the embodiment of FIG. 11 in that processing of Steps S31 to S34 is added to the flowchart of FIG. 12.

First, the commercial power source monitoring module 511 monitors the existence/absence of power source supply from the commercial power source AC based on an output of the rectifier circuit DB1. When the commercial power source monitoring module 511 determines the existence of a power source interruption state where the power source is not supplied, the power source interruption count part 512 measures the power interruption time.

Figure 16:
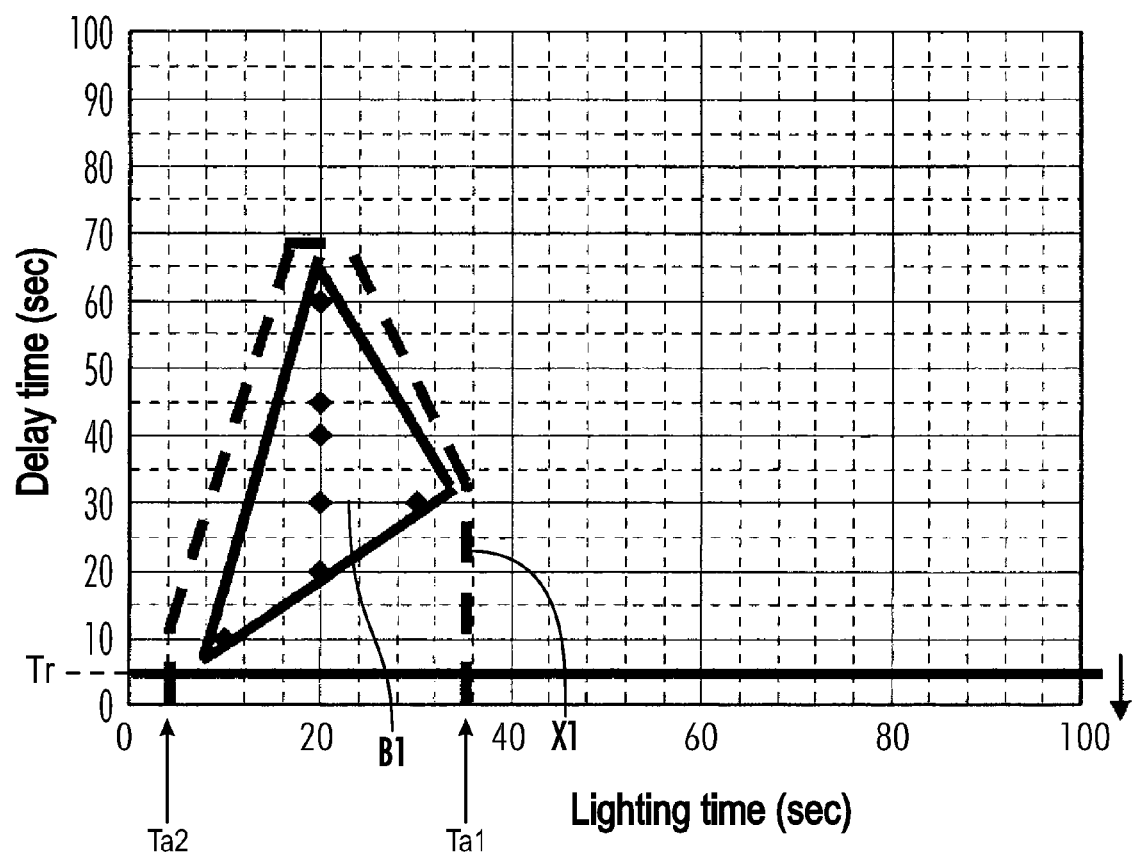
FIG. 16 is a diagram showing a relation between the lighting time and the delay time of the embodiment of FIG. 14.

Next, a reference time Tb (a third reference time) shorter than a lower limit value of the delay time of the domain B1 where the restart fails is set up as shown in FIG. 16. The comparison module 56 compares a power source interruption time and the reference time Tb, and in the case where the interruption time is shorter than the reference time Tb, the delay time setting module 57 resets the delay time to "0."

Then, at Step S13 after the high-pressure discharge lamp La is shut down, the commercial power source monitoring module 511 determines whether there is a supply of the commercial power source AC. If not, the power source interruption time count module 512 starts measurement of the power source interruption time (S34), and operation is halted until input of the power source is performed (S14). If the commercial power source monitoring module 511 determines that there is a present supply of the commercial power source AC, the power source interruption time count module 512 halts measurement of the power source interruption time, which fixes the power source interruption time (S31).

Next, the comparison module 56 compares the power source interruption time with the reference time Tb (an extremely short time that is located outside the domain B1) (S32). When the power source interruption time is shorter than the reference time Tb, the delay time setting module 57 resets the delay time to "0" (S33), and the start voltage control module 58 quickly initiates the start voltage generating operation of applying the starting high voltage to the high-pressure discharge lamp La in the unlit state (S4). On the other hand, when the power source interruption time is the reference time Tb or more, the start voltage control module 58 halts the start voltage generating operation during the delay time from Step S21 (S3) and subsequently starts the operation (S4).

Therefore, when the power source interruption time is very short, the restart can be done quickly irrespective of the lighting time. Particularly in the case where the high-pressure discharge lamp La is shut down after a short lighting time, because the inside of the arc tube is in an active state even after the high-pressure discharge lamp La shut down and the temperature of the arc tube has not risen, it becomes possible to do an operation quickly in a domain where the restart is possible by applying the starting high voltage immediately after the shutdown, and the delay time can be made "0." Even in the case where, due to a long lighting time, the temperature of the arc tube has increased to such a degree that a long delay time is required for the restart, it becomes possible to do an operation quickly in a domain where the restart is possible by applying the starting high voltage immediately after shutdown, and the delay time can be made "0."

Figure 17:
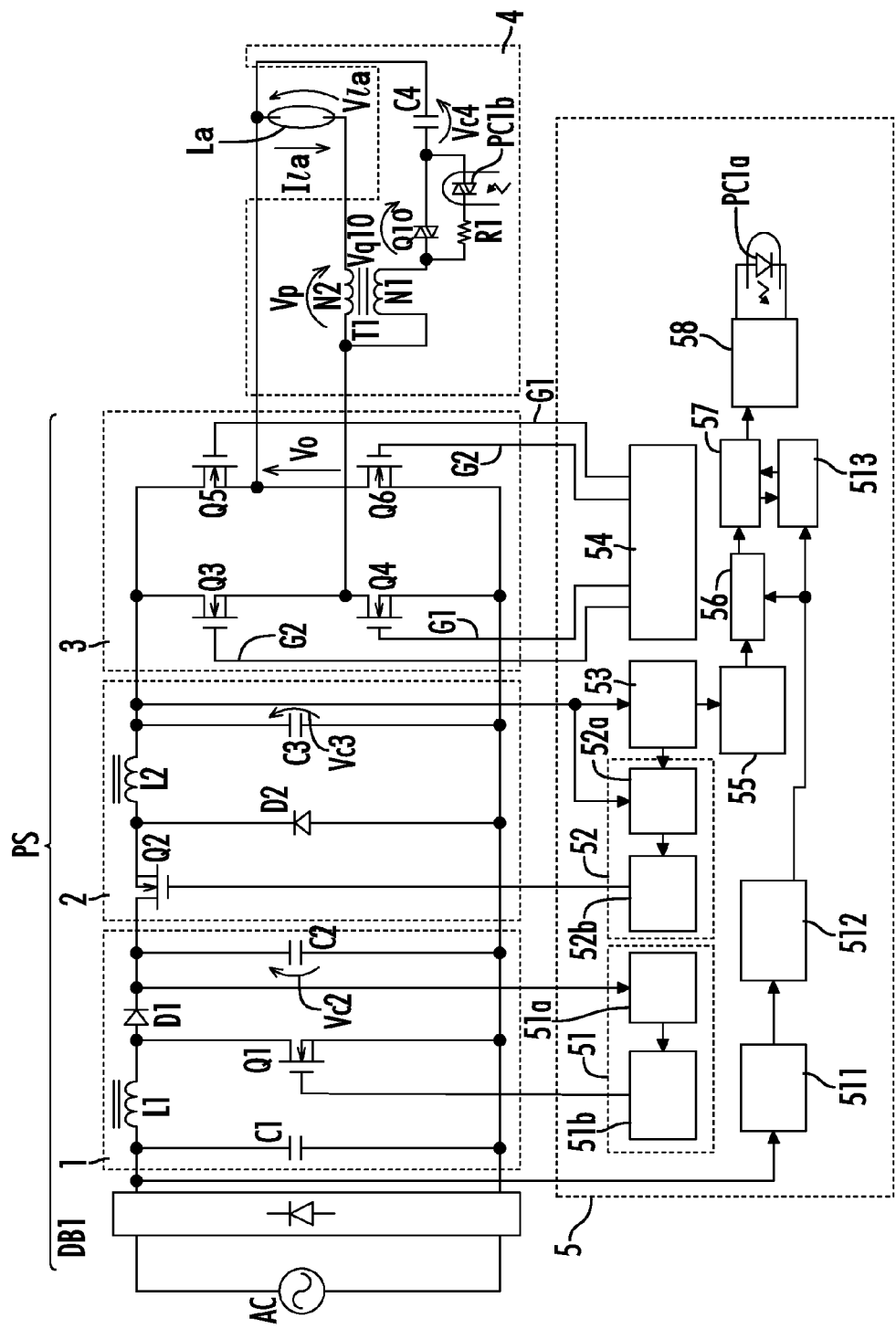
FIG. 17 is a diagram showing a circuit configuration of another embodiment of the high-pressure lamp ballast of the present invention.
Figure 18:
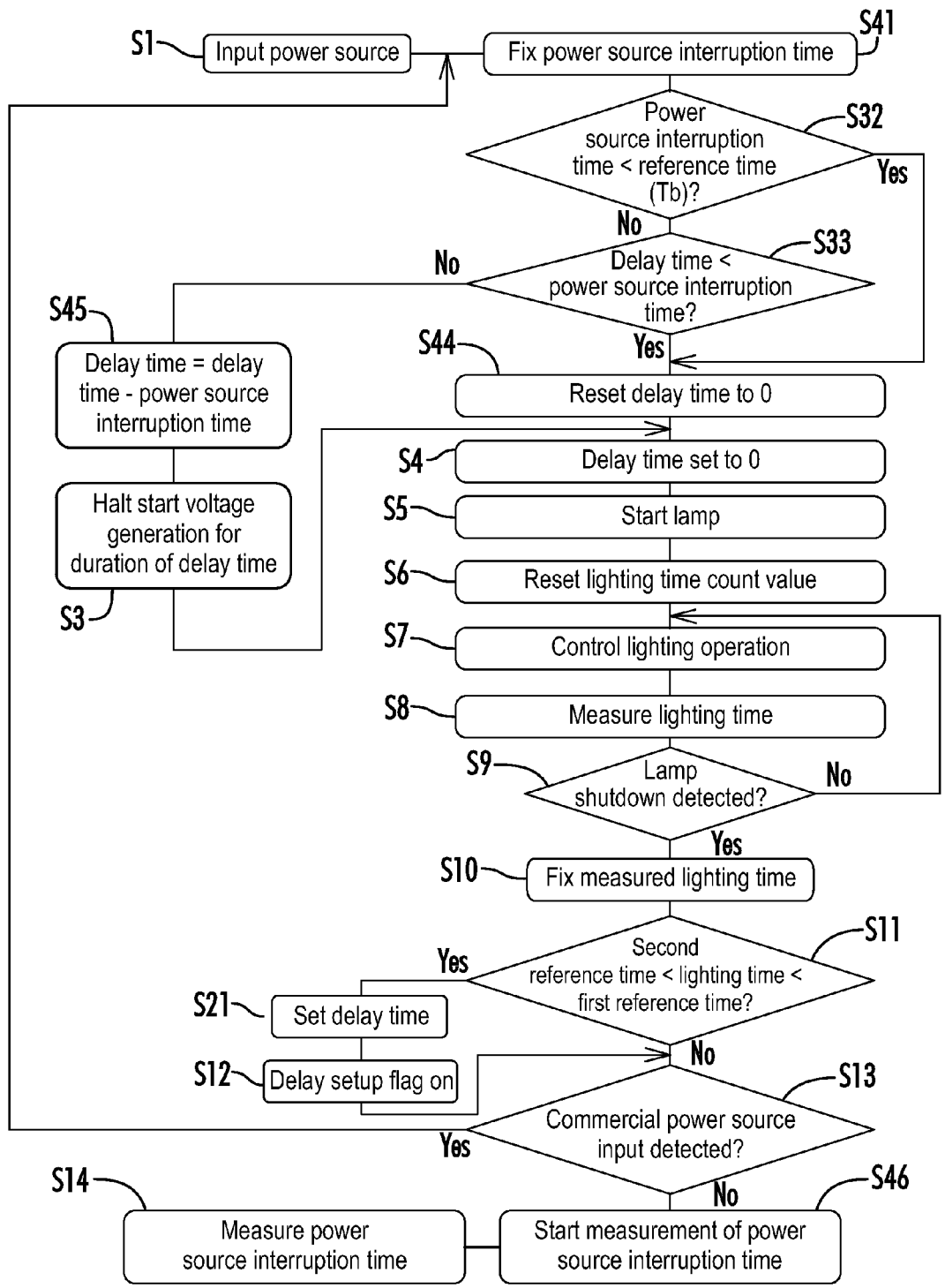
FIG. 18 is an operational flowchart of the embodiment of FIG. 17.

Referring now to FIG. 17, another embodiment of the high-pressure lamp ballast of the present invention is shown. The ballast includes a commercial power source monitoring module 511, a power source interruption time count module 512, and an interruption time comparison module 513. Operation of the ballast is shown in the flowchart of FIG. 18, and it differs from previous embodiments in that Steps S41 to S46 are added to the flowchart of FIG. 12.

First, the commercial power source monitoring module 511 monitors the existence/absence of power source supply from the commercial power source AC based on the output of the rectifier circuit DB1. When the commercial power source monitoring module 511 determines that it is in the power source interruption state where no power source is supplied, the power source interruption time count module 512 measures the power source interruption time. The interruption time comparison module 513 compares the delay time set up by the delay time setting module 57 at Step S21 and the power source interruption time measured by the power source interruption time count module 512 and outputs the comparison result to the delay time setting module 57.

Then, at Step S13 after the high-pressure discharge lamp La is shut down, the commercial power source monitoring module 511 determines whether there is a present supply of the commercial power source AC. If not, the power source interruption time count module 512 starts the measurement of the power source interruption time (S46) and operation is halted (S14). If the commercial power source monitoring module 511 determines that there is a supply of the commercial power source AC, the power source interruption time count module 512 halts the measurement of the power source interruption time, which fixes the power source interruption time (S41).

Further, as with previous embodiments such as shown in FIG. 16, where a reference time Tb that is shorter than the lower limit value of the delay time of the domain B1 where the restart fails is set up, the comparison module 56 compares the power source interruption time and the reference time Tb, and when the interruption time is shorter than the reference time Tb, the delay time setting module 57 resets the delay time to "0."

Specifically, the comparison module 56 compares the power source interruption time with the reference time Tb (an extremely short time that is located outside the domain B1) (S42). When the power source interruption time is shorter than the reference time Tb, the delay time setting module 57 resets the delay time to "0" (S44), and the start voltage control module 58 initiates quickly the start voltage generating operation of applying the starting high voltage to the high-pressure discharge lamp La in the unlit state (S4).

On the other hand, when the power source interruption time is the reference time Tb or more, the interruption time comparison module 513 compares the delay time set by the delay time setting module 57 at Step S21 and the power source interruption time measured by the power source interruption time count module 512 in Step S41 (S43). When the power source interruption time is longer than the delay time, the delay time setting module 57 resets the delay time to "0" (S44), and the start voltage control module 58 quickly initiates the start voltage generating operation of applying the starting high voltage to the high-pressure discharge lamp La in the unlit state. Moreover, when the power source interruption time is shorter than the delay time, the delay time setting module 57 resets a value obtained by subtracting the power source interruption time from the delay time as a new delay time (S45), and after halting the start voltage generating operation (S3) during the delay time being set up at Step S45, the start voltage control module 58 starts the operation (S4).

Therefore, since the power source interruption time of the commercial power source AC can be included in a required delay time, and the delay time at the time of the restart can be specified as a time that the high-pressure discharge lamp La essentially requires, a time required for the restart can be set to a minimum while inhibiting generation of an unnecessary starting high voltage.

Figure 19A:
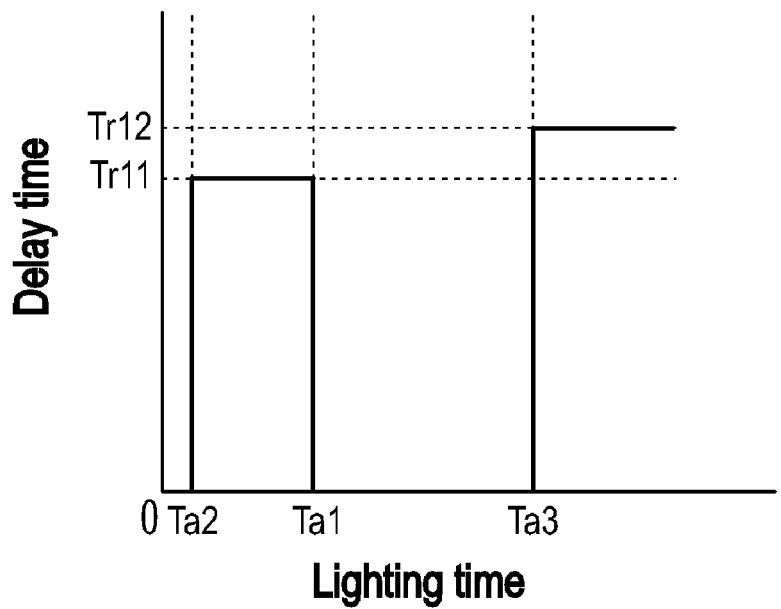
FIGS. 19(a), (b) are diagrams showing a relation between the lighting time and the delay time of another embodiment of the high-pressure lamp ballast of the present invention.

A high-pressure lamp ballast of the present embodiment is equipped with a configuration that satisfies a relation of a lighting time and a delay time shown in FIGS. 19(a), (b).

First, in FIG. 19(a), when the lighting time is longer than the reference time Ta2 and is shorter than the reference time Ta1, the delay time is set to Tr11. When the lighting time is longer than a reference time Ta3, the delay time is set to Tr12, wherein Tr11<Tr12.

Figure 19B:
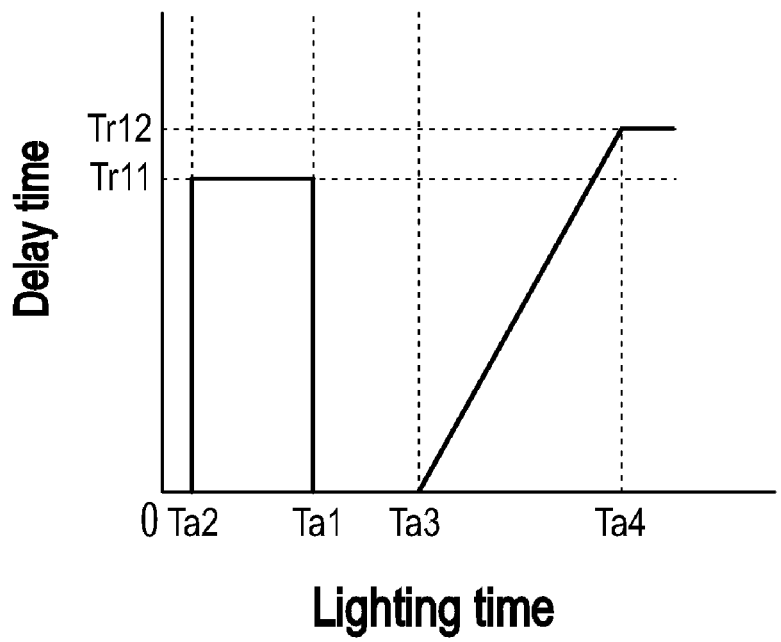

Moreover, in FIG. 19(b), when the lighting time is longer than the reference time Ta2 and is shorter than the reference time Ta1, the delay time is set to Tr11. When the lighting time is longer than the reference time Ta3 and is shorter than a reference time Ta4, the delay time increases linearly from "0" to the reference time Tr12. When the lighting time is longer than the reference time Ta4, the delay time is set to Tr12, wherein Tr11<Tr12.

It is also possible to adapt a characteristic in which the relation of the lighting time and the delay time is as described above to various alternative embodiments of the high-pressure lamp ballast of the present invention.

Figure 20:
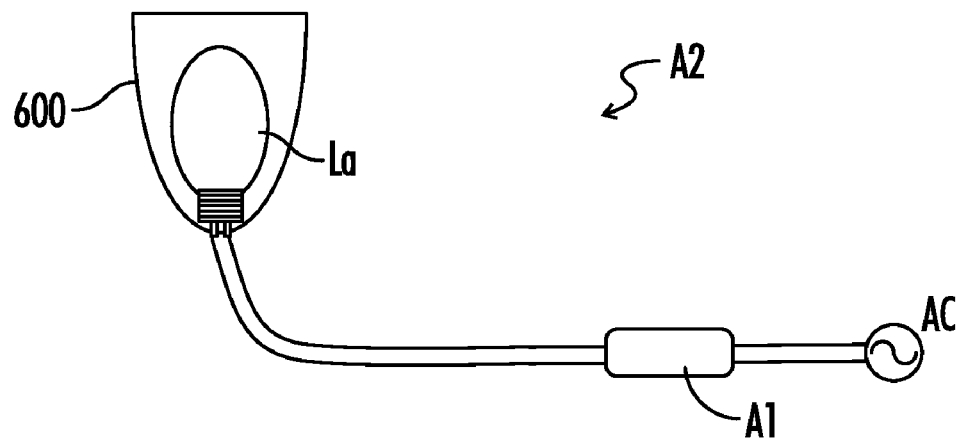
FIG. 20 is a diagram showing a configuration of a lamp fixture for use with various embodiments of the present invention.

FIG. 20 shows an example of a lamp fixture A2 that uses a high-pressure lamp ballast A1 of various embodiments as described herein. An output of the high pressure ballast A1 that uses the commercial power source AC as an input is connected to the high-pressure discharge lamp La mounted on the inside of a lighting fixture 600, and even when the restart is done quickly after a short lighting time of the high-pressure discharge lamp La, it becomes possible to safely perform the restart.

Figure 21:
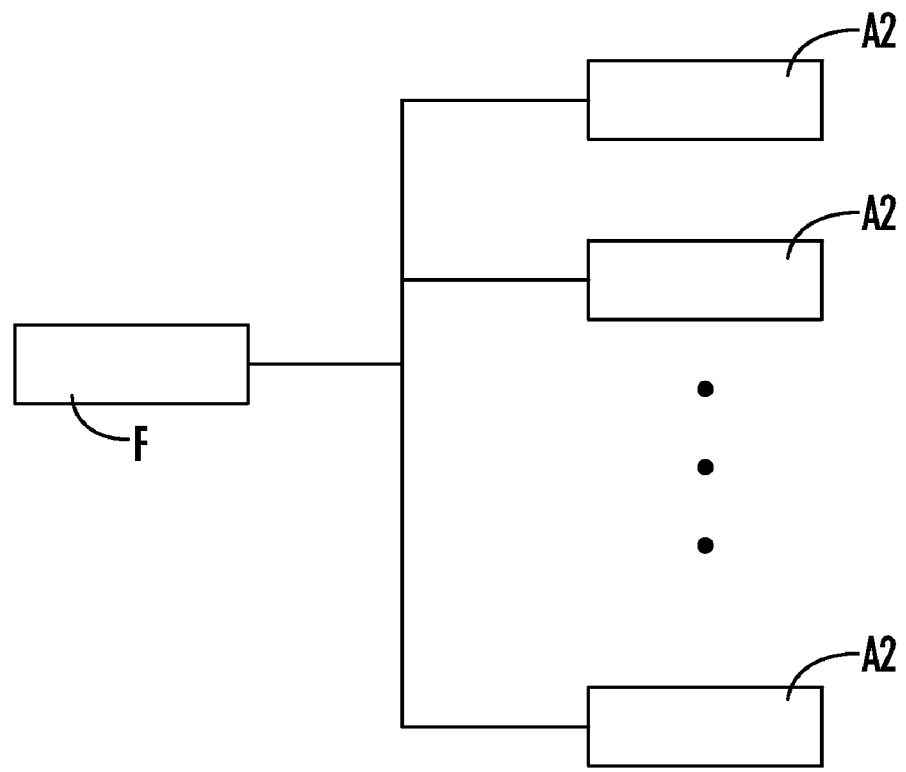
FIG. 21 is a diagram showing a configuration of a lighting system in accordance with various embodiments of the present invention.

In addition, as shown in FIG. 21, it is possible to configure a lighting system by using a plurality of lamp fixtures A2 together with a control device F that controls respective lighting devices A2.

Thus, although there have been described particular embodiments of the present invention of a new and useful High-Pressure Discharge Lamp Ballast with Rapid Lamp Restart Circuit, it is not intended that such references be construed as limitations upon the scope of this invention except as set forth in the following claims.

What is claimed is:

1. An electronic ballast comprising:
   a power supply circuit configured to supply power to a high-pressure discharge lamp;
   a start voltage generation circuit configured to supply a starting high voltage to the high-pressure discharge lamp; and
   a control circuit for controlling the power supply circuit and the start voltage generation circuit, the control circuit further comprising
   a lighting transition module for detecting a startup or shutdown of the lamp,
   a lighting time count module for measuring a lighting time of the lamp when the lighting transition module detects a startup of the lamp,
   a comparison module for comparing the lighting time measured by the lighting time count module and a first reference time when the lighting transition module detects a shutdown of the lamp, and
   a delay time setting module for setting a predetermined delay time of the start voltage generation circuit based on the comparison result of the comparison module.

2. The ballast of claim 1, wherein the predetermined delay time is conditioned upon the lighting time being less than the first reference time at the time when the lamp is shut down.

3. The ballast of claim 2, wherein
   the start voltage generation circuit halts operation during a period from occurrence of a startup trigger to a lapse of the delay time, and supplies the starting high voltage to the high-pressure discharge lamp after the lapse of the delay time.

4. The ballast of claim 3, wherein the comparison module compares the first reference time and a second reference time that is shorter than the first reference time with the measured lighting time,
   wherein upon a condition that the lighting time is longer than the second reference time and shorter than the first reference time, the delay time setting module sets a predetermined delay time,
   wherein upon a condition that the lighting time is not longer than the second reference time or less than the first reference time, the delay time setting module sets the delay time to zero.

5. The ballast of claim 4, wherein the delay time setting module sets up a predetermined delay time that depends on the lighting time.

6. The ballast of claim 5, wherein a delay time set upon a condition that the lighting time is equal to the first reference time and a delay time set upon a condition that the lighting time is equal to the second reference time are times that are a maximum value of the delay time.

7. The ballast of claim 1, wherein
   the power supply circuit is further configured to convert an electric power from an input power source into an electric power to be supplied to the high-pressure discharge lamp;
   the control circuit further includes
   a power source monitoring module for monitoring a supply state of the input power source to the electric power supply circuit and
   a power source interruption time count module for measuring a power source interruption time from a time when the power source is interrupted to a time when it is resupplied based on the monitoring result of the power source monitoring module.

8. The ballast of claim 7, wherein the comparison module compares a power source interruption time measured by the power source interruption time count module and a third reference time; and
   the delay time setting module resets the delay time to zero upon a condition that the power source interruption time is the third reference time or less.

9. The ballast of claim 8, wherein
   the control circuit has an interruption time comparison module for comparing the delay time set by the delay time setting module and the power source interruption time measured by the power source interruption time count module; and
   the delay time setting module resets the delay time to zero upon a condition that the power source interruption time is longer than the delay time.

10. The ballast of claim 9, wherein the delay time setting module further resets a value obtained by subtracting the power source interruption time from the delay time to a new delay time upon a condition that the power source interruption time is shorter than the delay time.

11. The ballast of claim 1,
    the start voltage generation circuit further comprising a photo-thyristor coupled to the lamp through a capacitor, and
    the control circuit further comprising a light-emitting diode photo-coupled to the photo-thyristor, the light-emitting diode energized based on the delay time from the delay time setting module.

12. The ballast of claim 11, wherein a start time of the start voltage generation circuit is controlled by turning on the photo-thyristor upon energizing of the light-emitting diode, wherein the capacitor is charged to initiate the start of the high-pressure discharge lamp.

13. A control circuit for an electronic ballast comprising:
    a lighting transition module configured to detect when power is initially supplied from a power supply to an unlit high-pressure discharge lamp and further configured to detect when a lit discharge lamp is shut down;
    a lighting time count module configured to measure a lighting time of the lamp when the lighting transition module detects power being initially supplied to the lamp;
    a comparison module configured to compare the lighting time measured by the lighting time count module and a first reference time when the lighting transition module detects a shutdown of the lamp;
    a delay time setting module configured to set a predetermined delay time based on the comparison result of the comparison module; and
    a start voltage control module configured to provide a high starting voltage to the lamp upon lapse of the delay time.

14. The control circuit of claim 13, further comprising
a switching circuit configured to switch an operating mode of the ballast between a start mode for starting the lamp from an unlit state and a lighting mode for powering the lamp in steady state,
wherein the switching circuit in a start mode controls the switching rate of a plurality of switching elements coupled to the lamp based on signals provided by the start voltage control module, wherein the high starting voltage is provided to the lamp upon lapse of the delay time.

15. The control circuit of claim 14, further comprising
a lamp voltage detection circuit, and
an lighting mode control circuit,
wherein the lighting mode control circuit in the lighting mode controls the switching elements through the switching circuit based on the lamp voltage detected by the lamp voltage detection circuit.

16. The control circuit of claim 13, further comprising a light-emitting diode effective for photo-coupling to a photo-thyristor further coupled to the lamp, the light-emitting diode energized based on the delay time from the delay time setting module.

17. The ballast of claim 16, wherein the start voltage control module is configured to control a start time by energizing of the light-emitting diode, wherein the photo-thyristor is turned on and startup of the lamp initiated.

18. A method of quickly restarting a high-pressure discharge lamp after shutdown, the method comprising:
providing an electronic ballast further comprising a power supply circuit for providing power to the lamp and a start voltage generation circuit configured to provide a high starting voltage to the lamp;
detecting a transition in the lamp indicating the lamp is being turned on or shut down;
upon detecting the lamp being turned on, measuring a lighting time for the lamp;
upon detecting the lamp being shut down, comparing the lighting time to a predetermined reference time;
generating a delay time dependent upon the comparison result;
halting operation of the ballast during a period from occurrence of a startup trigger to a lapse of the delay time; and
upon lapsing of the delay time, supplying the high starting voltage to the lamp.

19. The method of claim 18, wherein
the delay time is conditioned upon the lighting time being less than the predetermined reference time at the time when the lamp is shut down.

20. The method of claim 19, wherein
the step of comparing the lighting time to a predetermined reference time further comprising comparing the lighting time to a first reference time and a second reference time that is shorter than the first reference time, and
the step of generating a delay time dependent upon the comparison result further comprising generating a predetermined delay time when the lighting time is longer than the second reference time and shorter than the first reference time and generating a delay time of zero when the lighting time is not longer than the second reference time or less than the first reference time.

21. The method of claim 20, further comprising
monitoring an input power source to the power supply circuit;
measuring a power source interruption time from a time when the power source is interrupted to a time when it is resupplied based on a result of the monitoring step;
comparing the power source interruption time and a third reference time; and
upon a condition that the power source interruption time is the third reference time or less, resetting the delay time to zero.

22. The method of claim 21, further comprising
comparing the delay time and the power source interruption time; and
upon a condition that the power source interruption time is longer than the delay time, resetting the delay time to zero.

23. The ballast of claim 22, further comprising
upon a condition that the power source interruption time is shorter than the delay time, resetting a value obtained by subtracting the power source interruption time from the delay time to a new delay time.

* * * * *